(12) United States Patent
Negishi et al.

(10) Patent No.: US 6,442,627 B1
(45) Date of Patent: Aug. 27, 2002

(54) OUTPUT FIFO DATA TRANSFER CONTROL DEVICE

(75) Inventors: Hiroyasu Negishi; Junko Kobara; Yoshitsugu Inoue; Hiroyuki Kawai; Keijiro Yoshimatsu; Nelson Chan; Robert Streitenberger, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/453,547

(22) Filed: Dec. 3, 1999

(30) Foreign Application Priority Data

Jul. 6, 1999 (JP) ............................................. 11-192054

(51) Int. Cl.$^7$ ................................................. G06F 3/00
(52) U.S. Cl. ............................. 710/52; 710/53; 703/14; 712/18; 712/225
(58) Field of Search ............................. 710/52, 53, 56, 710/57; 703/14; 712/18, 225

(56) References Cited

U.S. PATENT DOCUMENTS

| | | | | |
|---|---|---|---|---|
| 5,448,689 A | * | 9/1995 | Matsuo et al. | 345/600 |
| 5,835,788 A | * | 11/1998 | Blumer et al. | 710/22 |
| 5,901,301 A | * | 5/1999 | Matsuo et al. | 712/1 |
| 6,253,310 B1 | * | 6/2001 | Ramirez et al. | 712/218 |
| 6,292,764 B1 | * | 9/2001 | Avery et al. | 703/14 |

FOREIGN PATENT DOCUMENTS

| | | |
|---|---|---|
| JP | 5-46547 | 2/1993 |
| JP | 6-301654 | 10/1994 |

* cited by examiner

*Primary Examiner*—Jeffrey Gaffin
*Assistant Examiner*—Harold Kim
(74) *Attorney, Agent, or Firm*—Burns, Doane, Swecker & Mathis, LLP

(57) ABSTRACT

An output FIFO data transfer control device can comprise a geometric arithmetic core including one integer processing unit or IPU and a plurality of floating-point processing units or FPUs. Each processing unit includes an intermediate buffer or data output buffer for storing a data on an arithmetic result. When an instruction of data transfer from at least one of the plurality of processing units to one output FIFO is issued, a write/read pointer generating unit generates a write pointer identifying a specific location where data on an arithmetic result associated with the instruction is to be stored in the intermediate buffer of at least one of the plurality of processing units. The write/read pointer generating unit also generates a read pointer identifying a specific location where data is to be read out of the intermediate buffer of at least one of the plurality of processing units. A transfer mode setting unit sets a transfer mode identifying which at least one of the plurality of processing units is to transfer data on an arithmetic result, and sequentially furnishes a read enable signal to at least one of the plurality of processing units so as to read out the data from the intermediate buffer of at least one of the plurality of processing units.

17 Claims, 22 Drawing Sheets

FIG.3

| DESTINATION CODE (TRANSFER MODE CODE) | | | | PROCESSING UNITS THAT ARE TO TRANSFER DATA |
|---|---|---|---|---|
| BIT 3 | BIT 2 | BIT 1 | BIT 0 | |
| 0 | 0 | 0 | 0 | IPU |
| 0 | 0 | 0 | 1 | FPU0 |
| 0 | 0 | 1 | 0 | FPU1 |
| 0 | 0 | 1 | 1 | FPU0, FPU1 |
| 0 | 1 | 0 | 0 | FPU2 |
| 0 | 1 | 0 | 1 | FPU0, FPU2 |
| 0 | 1 | 1 | 0 | FPU1, FPU2 |
| 0 | 1 | 1 | 1 | FPU0, FPU1, FPU2 |
| 1 | 0 | 0 | 0 | FPU3 |
| 1 | 0 | 0 | 1 | FPU0, FPU3 |
| 1 | 0 | 1 | 0 | FPU1, FPU3 |
| 1 | 0 | 1 | 1 | FPU0, FPU1, FPU3 |
| 1 | 1 | 0 | 0 | FPU2, FPU3 |
| 1 | 1 | 0 | 1 | FPU0, FPU2, FPU3 |
| 1 | 1 | 1 | 0 | FPU1, FPU2, FPU3 |
| 1 | 1 | 1 | 1 | FPU0, FPU1, FPU2, FPU3 |

FIG.4

| INSTRUCTION | (A) | (B) | (C) | (D) | (E) | (F) |
|---|---|---|---|---|---|---|

CLK, hold, IPUouse, FPU Mode: 0, 7, 3, 7, 3

FPUouse

Write Pointer: 0, 1, 2, 3, 4, 5

FPU Write Enable: 00, 02, 04, 00, 01, 02, 00

FPU0 OUTPUT BUFFER
- [0] 00000000
- [1] 00000000 ... 40000000
- [2] 00000000 ... 40000000
- [3] 00000000
- [4] 00000000 ... 40000000
- [5] 00000000 ... 40000000
- [6] 00000000
- [7] 00000000

FPU Write Enable: 00, 02, 04, 00, 01, 02, 00

FPU1 OUTPUT BUFFER
- [0] 00000000
- [1] 00000000 ... 41000001
- [2] 00000000 ... 41000001
- [3] 00000000
- [4] 00000000 ... 41000001
- [5] 00000000 ... 41000001
- [6] 00000000
- [7] 00000000

FPU Write Enable: 00, 02, 04, 00, 01, 02, 00

FPU2 OUTPUT BUFFER
- [0] 00000000
- [1] 00000000 ... 42000002
- [2] 00000000
- [3] 00000000
- [4] 00000000 ... 42000002
- [5] 00000000
- [6] 00000000
- [7] 00000000

FPU Write Enable: 00, 02, 04, 00, 01, 02, 00

FPU3 OUTPUT BUFFER
- [0] 00000000
- [1] 00000000
- [2] 00000000 ... 43000003
- [3] 00000000
- [4] 00000000 ... 43000003
- [5] 00000000
- [6] 00000000
- [7] 00000000

IPU Write Enable: 00, 01, 00, 01, 00

IPU OUTPUT BUFFER
- [0] 00000000 ... 82000000
- [1] 00000000
- [2] 00000000
- [3] 00000000 ... 82000000
- [4] 00000000
- [5] 00000000
- [6] 00000000
- [7] 00000000

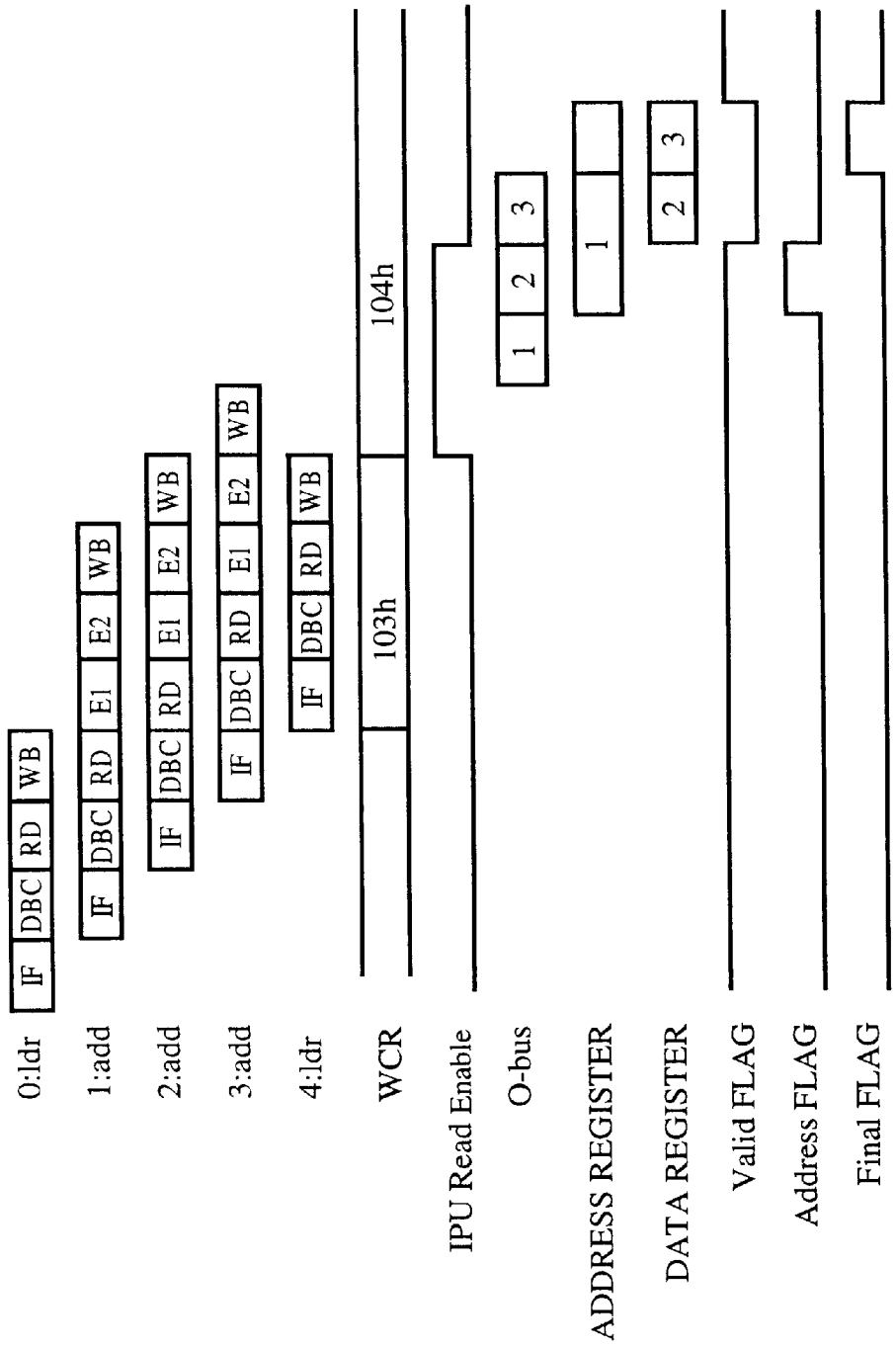

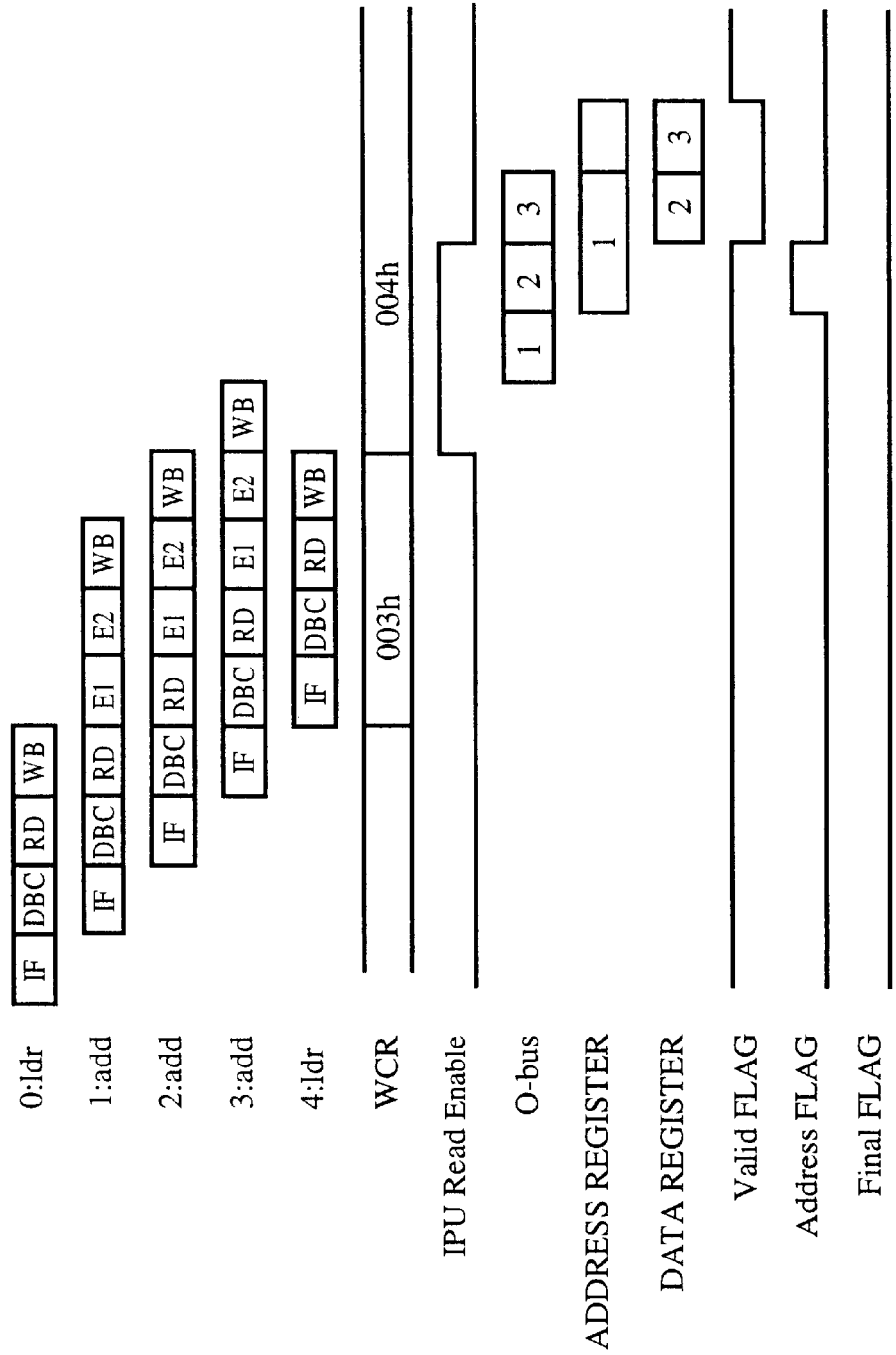

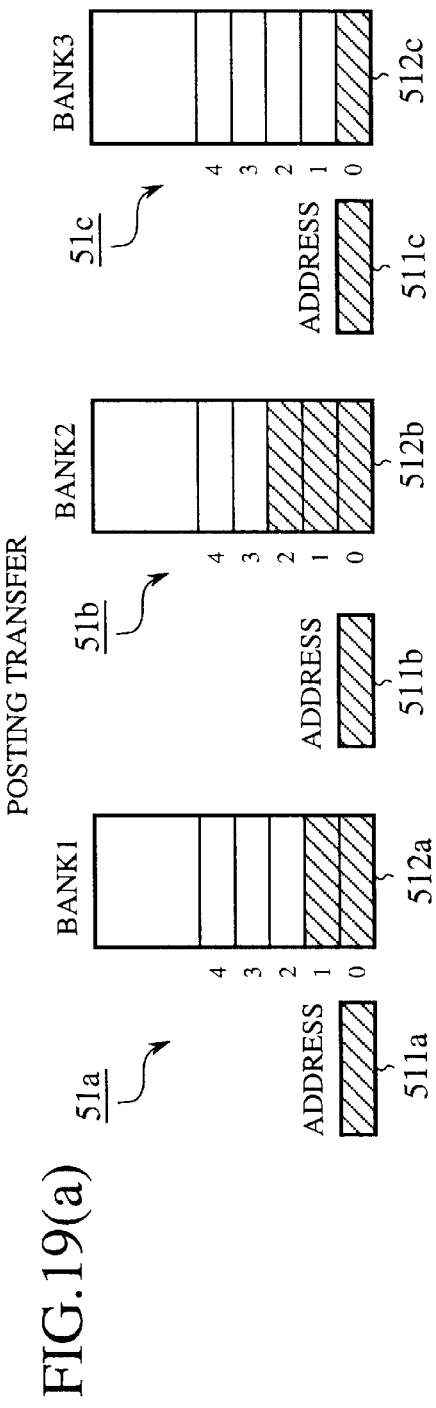
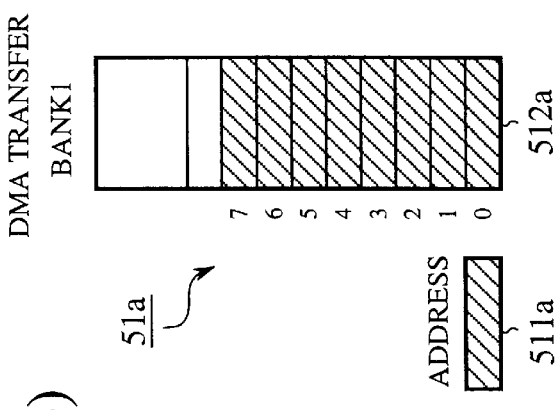
FIG.19(a)
FIG.19(b)

AGP MODE

| | |
|---|---|
| --- | --- |
| 6 | 7 |
| 4 | 5 |
| 2 | 3 |
| 0 | 1 |

PCI MODE

| | |
|---|---|
| --- | |
| 3 | EMPTY AREA |
| 2 | |
| 1 | |
| 0 | |

IMPROVED PCI MODE

| | |
|---|---|
| --- | --- |
| 3 | 35 |
| 2 | 34 |
| 1 | 33 |
| 0 | 32 |

TO RENDERING LSI

US 6,442,627 B1

OUTPUT FIFO DATA TRANSFER CONTROL DEVICE

BACKGROUND OF THE INVENTION

1. Field of the Invention

The present invention relates to an output first-in first-out (or FIFO) data transfer control device for controlling transfer of arithmetic results by a geometric arithmetic core included in a geometric arithmetic processor for performing 3D graphic processing to an output FIFO and to outside the geometric arithmetic processor.

2. Description of the Prior Art

Referring now to FIG. 21, there is illustrated a block diagram showing the structure of a geometric arithmetic processor including a prior art output FIFO data transfer control device. In the figure, reference numeral 10 denotes a geometric arithmetic core (or geometric arithmetic engine) for performing 3D graphic processing, 20 denotes an AGP port that is an interface for connecting a host CPU (not shown) disposed outside the geometric arithmetic processor 100 with the geometric arithmetic processor 100, 5 denotes a RC port or output control unit that is an interface to a secondary bus 6, 30 denotes a PCI bridge between the AGP port 20 and the output control unit 5, and 40 denotes an output FIFO (or OFIFO) data transfer control unit for controlling data transfer from each processing unit included in the geometric arithmetic core 10 to the output control unit 5 and data transfer from the output control unit 5 to the secondary bus 6. FIG. 22 shows a block diagram showing the structures of the prior art geometric arithmetic core 10, the OFIFO data transfer control unit 40, and the output control unit 5 as shown in FIG. 21. In FIG. 22, reference numeral 11 denotes an integer processing unit or IPU, 111 denotes a data output register (or DRIA) for storing data on an arithmetic result from an integer ALU of the IPU 11, 112 denotes a data output register (or DRIS) for use with a shifter used for performing integer arithmetic operations, 114 denotes a tristate buffer, 12a to 12d denote first to fourth floating-point arithmetic units (or FPU0 to FPU3), 121a denotes a data output register (or DRFA) for storing data on an arithmetic result from a floating-point ALU of the FPU0 12a, 122a denotes a data output register (or DRFM) for storing data on an arithmetic result from a floating-point multiplier of the FPU0 12a, and 124a denotes a tristate buffer. Needless to say, each of the remaining floating-point processing units FPU1 12b to FPU3 12d includes a DRFA, a DRFM, and a tristate buffer.

Reference numeral 421 denotes a transfer mode setting section for setting a transfer mode identifying which at least one of the IPU 11 and the plurality of floating-point processing units FPU0 12a to FPU3 12d is to transfer data to the output control unit 5, 431 denotes a Full flag checking section for receiving a Full flag from the output control unit 5 and for determining if the OFIFO data transfer control unit can transfer data to the output control unit 5, 441 denotes an O-bus data input section for writing data furnished onto the O-bus 3 into an address register thereof if the data is an address, and for writing the data into a data register thereof otherwise, 451 denotes a WCR control section for controlling a word counter or WCR showing the size of each burst upon the data transfer to the output control unit 5, 461 denotes a data output section for performing the data transfer while controlling the data transfer to the output control unit 5, 51 denotes an output FIFO (or OFIFO) section included in the output control unit 5, and 511 denotes an address storage section for storing a starting address of data stored in one corresponding OFIFO 512. The output control unit 5 can include eight OFIFO sections 51. The data output section 461 can generate and furnish a Valid flag indicating whether or not the value of the data register within the O-bus data input section 441 is valid, an address flag indicating whether or not the data temporarily stored in the O-bus data input section 441 is an address, and a final flag indicating whether or not the data is the last one of each burst, to the output control unit 5 including the eight OFIFO units 51, as well as the data. The final flag is also a kickoff signal for triggering the output control unit 5 to transfer the data to a rendering LSI (not shown) by way of the secondary bus 6.

Next, a description will be made as to the operation of the prior art output FIFO data transfer control device according with reference to FIG. 23. FIG. 23 is a timing chart showing the operation of the prior art output FIFO data transfer control device. Assume that instructions of data transfer to one OFIFO 512 are sequentially issued as follows:

(1) data transfer instruction (A); destination code ofifo0: from IPU to OFIFO (data 1)

(2) data transfer instruction (B); destination code ofifo7: from FPU0, FPU1, and FPU2 to OFIFO (data 2, 3, and 4)

(3) data transfer instruction (C); destination code ofifo3: from FPU0 and FPU1 to OFIFO (data 5 and 6)

(4) data transfer instruction (D); destination code ofifo0: from IPU to OFIFO (data 7)

(5) data transfer instruction (E);
destination code ofifof: from FPU0, FPU1, FPU2, and FPU3 to OFIFO (data 8, 9, 10, and 11)

(6) data transfer instruction (F); destination code ofifo3: from FPU0 and FPU1 to OFIFO (data 12 and 13)

Each of the plurality of floating-point processing units FPU0 12a to FPU3 12d can operate according to SIMD (single instruction stream, multiple data stream) instructions and process a plurality of data when one instruction is issued. Each of the plurality of data transfer instructions (A) to (F) shown can be issued by one microcode. For example, the data transfer instruction (B) directs FPU0 12a, FPU1 12b, and FPU2 12c to simultaneously perform arithmetic operations and to furnish arithmetic result (i.e., data 2, 3, and 4) to one or more OFIFOs 512 within the output control unit 5 in the order of FPU0, FPU1, and FPU2.

Every time a microcode is executed and a data transfer instruction such as one of the plurality of data transfer instructions (A) to (F) as mentioned above is issued, either the IPU 11 or at least one of the plurality of floating-point processing units FPU0 12a to FPU3 12d associated with the data transfer instruction can furnish IPUouse or FPUouse to the OFIFO data transfer control unit 40. As shown in FIG. 23, when the data transfer instruction (B) is executed and FPUouse is asserted so that FPUouse becomes state 1, and, after that, FPUouse is negated after the data transfer instruction (A) is executed first and IPUouse is asserted so that IPUouse becomes 1, and, after that, IPUouse is negated, a hold signal is asserted low. Since a plurality of data processed according to an SIMD instruction can be sent out on the signal O-bus 3 when arithmetic instructions for the same processing unit are issued sequentially as in the case that the data transfer instruction (C) is executed immediately after the execution of the data transfer instruction (B), the execution of the next data transfer instruction before reading out all data associated with the previous data transfer instruction can result in overwriting all the data stored in the corresponding data output registers, such as DRFA and DRFM of each floating-point processing unit, with new arithmetic results. To avoid the overwriting, it is necessary to assert the hold signal so as to cause the geometric arithmetic core 10 to enter the wait state in which it stops instruction pipeline processing, as shown in FIG. 23. If the hold signal is asserted after either the IPU 11 or at least one of the plurality of floating-point processing units FPU0 12a to FPU3 12d associated with a data transfer instruction issued furnishes IPUouse or FPUouse to the OFIFO data transfer control unit 40, the OFIFO data transfer control unit furnishes a read enable signal to sequentially read all data associated with the data transfer instruction from all corresponding processing units. The prior art output FIFO data transfer control device thus needs much time for data transfer to the OFIFO because it frequently needs to cause the geometric arithmetic core 10 to enter the wait state in which it stops instruction pipeline processing to avoid the overwriting of old arithmetic results associated with a previous data transfer instruction, which has been executed immediately before the execution of a current data transfer instruction, with new arithmetic results produced by the execution of the current data transfer instruction.

A problem with the prior art output FIFO data transfer control device constructed as above is therefore that although the IPU and the plurality of floating-point processing units FPU0 to FPU3 included in the geometric arithmetic core can simultaneously perform arithmetic operations, the geometric arithmetic core frequently needs to enter the wait state in which it stops instruction pipeline processing until it sends out data from each processing unit onto the O-bus, thus increasing the time required for data transfer to the FIFO and decreasing the processing capabilities of the geometric arithmetic core.

SUMMARY OF THE INVENTION

The present invention is made to overcome the above problem. It is therefore an object of the present invention to provide an output FIFO data transfer control device capable of continuously executing instructions while transferring data on arithmetic results to an OFIFO without having to cause a geometric arithmetic core to enter the wait state in which it stops instruction pipeline processing.

In accordance with one aspect of the present invention, there is provided an output FIFO data transfer control device comprising: a plurality of intermediate buffers respectively disposed in a plurality of processing units included in an arithmetic core that operates based on an instruction pipeline, each of the plurality of intermediate buffers storing data on an arithmetic result produced by each of the plurality of processing units; an output control unit including one or more output FIFOs each of which receives data furnished by each of the plurality of processing units and temporarily stores the data therein, the output control unit furnishing data stored in the output FIFOs to outside the output FIFO data transfer control device in response to a predetermined signal applied thereto; a write/read pointer generating unit for, when an instruction of data transfer from at least one of the plurality of processing units to the output FIFOs is issued upon execution of a microcode, generating a write pointer identifying a specific location where data on an arithmetic result produced by at least one of the plurality of processing units associated with the instruction is to be stored in the intermediate buffer of at least one of the plurality of processing units, and for generating a read pointer identifying a specific location where data, which is written into the intermediate buffer according to the write pointer, is to be read out of the intermediate buffer of at least one of the plurality of processing units; a transfer mode setting unit for setting a transfer mode identifying which at least one of the plurality of processing units is to transfer data on an arithmetic result upon the execution of the microcode, and for sequentially furnishing a read enable signal to at least one of the plurality of processing units so as to read out the data from the intermediate buffer of at least one of the plurality of processing units; at least a bus on which the data is sent out in response to the read enable signal by at least one of the plurality of processing units; a data input unit for receiving the data sent out on the bus unit and for writing the data into a register thereof; and a data output unit for furnishing the data written into the register of the data input. unit to the output FIFOs of the output control unit.

In accordance with a preferred embodiment of the present invention, the write/read pointer generating unit can cause the arithmetic core to stop instruction pipeline processing to inhibit overwriting of old data with new data when the write/read pointer generating unit determines that the intermediate buffer of each of the plurality of processing units is full. Preferably, the write/read pointer generating unit determines whether or not the intermediate buffer of each of the plurality of processing units is full, according to a relationship between the write pointer and the read pointer.

In accordance with another preferred embodiment of the present invention, the intermediate buffer of each of the plurality of processing units has a size of 8 words.

In accordance with another preferred embodiment of the present invention, the arithmetic core includes one integer processing unit and a plurality of floating-point processing units. The write/read pointer generating unit can generate a set of write and read pointers for use with the intermediate buffer of the integer processing unit, and generate another set of write and read pointers for use with the intermediate buffers of the plurality of floating-point processing units.

In accordance with another preferred embodiment of the present invention, the output FIFO data transfer control device includes a bus for use with the integer processing unit and another bus for use with the plurality of floating-point processing units.

Preferably, the transfer mode setting unit can set a transfer mode according to a multiple-bit signal furnished by the arithmetic core upon the execution of the microcode, the multiple-bit signal identifying which at least one of the plurality of processing units is to transfer data on an arithmetic result.

In accordance with another preferred embodiment of the present invention, the output FIFO data transfer control device further comprises a DMA/posting transfer switching unit for switching between DMA transfer and posting transfer when transferring the data from the output FIFOs to outside the output FIFO data transfer control device.

In accordance with another preferred embodiment of the present invention, the output FIFO data transfer control device further comprises a word-counter register control unit including a word counter showing the size of each burst of data transfer to the output FIFOs, and a register whose one bit is assigned to a final flag indicating that data to be transferred is the last data of each burst. The DMA/posting transfer switching unit can switch between DMA transfer and posting transfer by determining whether the final flag is furnished to the output control unit including the output FIFOs according to a value set to the register of the word-counter register control unit upon the execution of the microcode. The output control unit can transfer data stored in the output FIFOs to outside the output FIFO data transfer control device in response to the final flag.

In accordance with another preferred embodiment of the present invention, the output FIFO data transfer control device further comprises a full checking unit for determining whether or not each of the output FIFOs is full with the time determined by predetermined information indicating whether an interface for use with data transfer from the output FIFOs to outside the output FIFO data transfer control device is an AGP or PCI bus.

Further objects and advantages of the present invention will be apparent from the following description of the preferred embodiments of the invention as illustrated in the accompanying drawings.

BRIEF DESCRIPTION OF THE DRAWINGS

FIG. 3 is a table showing a destination code within data transfer instructions for use with the output FIFO data transfer control device according to the first embodiment of the present invention;

FIG. 4 is a timing chart showing a operation of writing data into data output buffers, of the output FIFO data transfer control device according to the first embodiment of the present invention;

FIG. 17 is a timing chart showing a posting transfer operation of the output FIFO data transfer control device according to the sixth embodiment of the present invention;

FIG. 18 is a timing chart showing a DMA transfer operation of the output FIFO data transfer control device according to the sixth embodiment of the present invention;

FIG. 19($a$) is a diagram showing an example of locations where data are written into OFIFOs in the case of posting transfer by the output FIFO data transfer control device according to the sixth embodiment of the present invention;

FIG. 19($b$) is a diagram showing an example of locations where data are written into one OFIFO in the case of DMA transfer by the output FIFO data transfer control device according to the sixth embodiment of the present invention;

FIG. 20($a$) is a diagram showing locations where data are written into one OFIFO and a sequence in which the data are written into the OFIFO, in AGP mode, by an output FIFO data transfer control device according to a seventh embodiment of the present invention;

FIG. 20($b$) is a diagram showing locations where data are written into one OFIFO and a sequence in which the data are written into the OFIFO, in PCI mode, by the output FIFO data transfer control device according to the seventh embodiment of the present invention;

FIG. 20($c$) is a diagram showing locations where data are written into one OFIFO and a sequence in which the data are written into the OFIFO, in improved PCI mode, by the output FIFO data transfer control device according to the seventh embodiment of the present invention;

DETAILED DESCRIPTION OF THE PREFERRED EMBODIMENTS

First Embodiment

Figure 1:
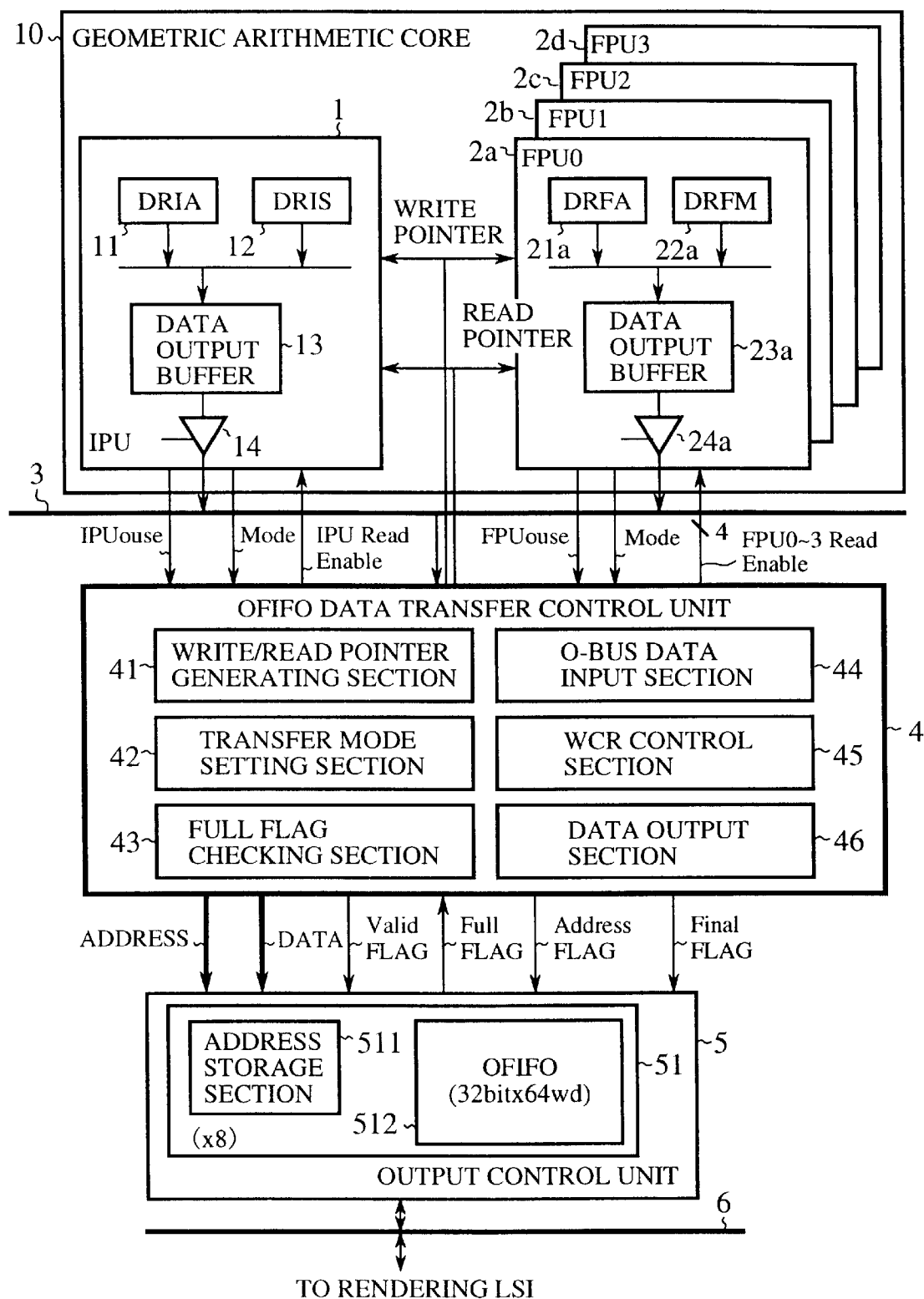
FIG. 1 is a block diagram showing the structure of an output FIFO data transfer control device according to a first embodiment of the present invention.

Referring next to FIG. 1, there is illustrated a block diagram showing the structure of an output FIFO data transfer control device according to a first embodiment of the present invention. In the figure, reference numeral 10 denotes a geometric arithmetic core for performing 3D graphic processing, 1 denotes an integer processing unit (or IPU), 11 denotes a data output register (or DRIA) for storing data on an arithmetic result from an integer ALU (not shown) of the IPU 1, 12 denotes a data output register (or DRIS) for use with a shifter used for performing integer arithmetic operations, 13 denotes an intermediate buffer or data output buffer, 14 denotes a tristate buffer, 2$a$ to 2$d$ denote first to fourth floating-point processing units (or FPU0 to FPU3), 21$a$ denotes a data output register (or DRFA) for storing data on an arithmetic result from a floating-point ALU (not shown) of the FPU0 2$a$, 22$a$ denotes a data output register (or DRFM) for storing data on an arithmetic result from a floating-point multiplier (not shown) of the FPU0 2a, 23a denotes an intermediate buffer or data output buffer, and 24a denotes a tristate buffer. Needless to say, each of the remaining floating-point processing units FPU1 2b to FPU3 2d includes a DRFA, a DRFM, a data output buffer, and a tristate buffer.

Furthermore, reference numeral 3 denotes an output bus (or O-bus), 4 denotes an OFIFO data transfer control unit for controlling data transfer from either the IPU 1 or at least one of the plurality of floating-point processing units FPU0 2a to FPU3 2d to one OFIFO 512 of an output control unit 5, and 41 denotes a write/read pointer generating section, responsive to a data transfer instruction signal IPUouse or FPUouse from either the IPU1 or the plurality of floating-point processing units FPU0 2a to FPU3 2d, the data transfer instruction signal indicating the issue of a data transfer instruction for data transfer to one OFIFO 512, for generating and furnishing a write pointer to the sender of the data transfer instruction signal IPUouse or FPUouse, the write pointer identifying a specific location where data on at least an arithmetic result from the sender of the data transfer instruction signal is to be stored or written into a corresponding data output buffer. The write/read pointer generating section 41 also generates and furnishes a read pointer to a corresponding processing unit, the read pointer identifying a specific location where data is to be read out of the data output buffer of either the IPU 1 or at least one of the plurality of floating-point processing units FPU0 2a to FPU3 2d. The data is the one that has been written into the data output buffer according to the write pointer generated by the write/read pointer generating section 41. Reference numeral 42 denotes a transfer mode setting unit for setting a transfer mode identifying which at least one of the IPU 1 and the plurality of floating-point processing units FPU0 2a to FPU3 2d is to transfer data to the output control unit 5, according to a signal Mode indicating the transfer mode from either the IPU 1 or the plurality of floating-point processing units FPU0 2a to FPU3 2d, and for generating and furnishing at least a read enable signal (either an IPU read enable signal or at least one of FPU0 to FPU3 read enable signals) to at least one processing unit that has requested data transfer according to the transfer mode, 43 denotes a Full flag checking section for receiving a Full flag from the output control unit 5 and for determining if the OFIFO data transfer control unit can transfer data to the output control unit 5, 44 denotes an O-bus data input section for writing data furnished on the O-bus 3 into an address register thereof if the data is an address, and for, otherwise, writing the data into a data register thereof, incrementing the previous address which it generated before receiving the data by one, and writing the current address into the address register, 45 denotes a WCR control section for controlling a word counter or WCR showing the size of each burst for data transfer to the output control unit 5, 46 denotes a data output section for performing the data transfer while controlling the data transfer to the output control unit 5, 51 denotes an output FIFO (or OFIFO) section included in the output control unit 5, and 511 denotes an address storage section for storing a starting address of data stored in a corresponding one of the plurality of OFIFOs 512. The output control unit 5 can include eight OFIFO sections 51. The data output section 46 can generate and furnish a Valid flag indicating whether or not the value of the data register within the O-bus data input section 44 is valid, an address flag indicating whether or not the data temporarily stored in the O-bus data input section is an address, and a final flag indicating whether or not the data is the last one of each burst, to the output control unit 5 including the eight OFIFO sections 51, as well as the data. The final flag is also a kickoff signal for triggering the output control unit 5 to transfer the data to a rendering LSI (not shown) by way of a secondary bus 6.

Figure 2:
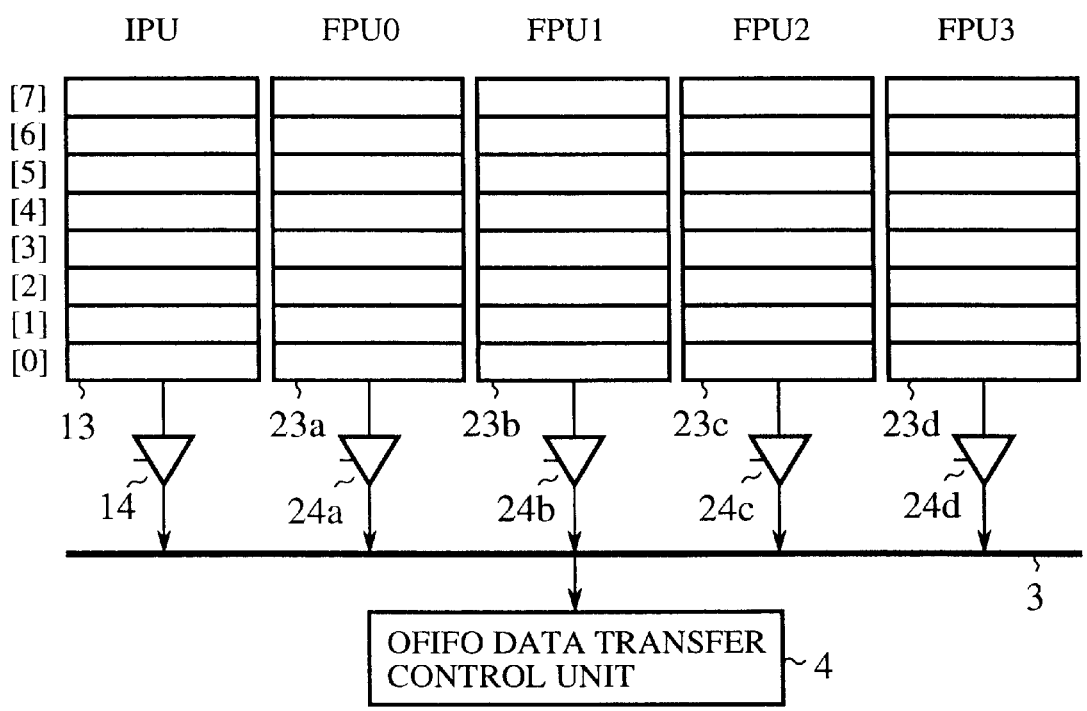
FIG. 2 is a block diagram showing the structure of an example of an intermediate buffer or data output buffer included in each of a plurality of processing units within the output FIFO data transfer control device according to the first embodiment of the present invention.

In the output FIFO data transfer control device according to the first embodiment of the present invention, the data output buffer of each processing unit, such as the IPU1 or each of the plurality of floating-point processing units FPU0 2a to FPU3 2d, can have a size of 8 words, as shown in FIG. 2. The eight one-word areas of the data output buffer of each processing unit can be numbered 0 to seven, respectively. Needless to say, the size of the data output buffer of each processing unit is not limited to eight words. Since the geometric arithmetic core 10, however, performs arithmetic operations in units of eight words in most cases, setting the size of the data output buffer of each processing unit to eight words, as shown in FIG. 2, makes it possible to transfer data at a high speed.

In operation, each of the IPU 1 and the plurality of floating-point processing units FPU0 2a to FPU3 2d can furnish the data transfer instruction signal IPUouse or FPUouse according to an instruction of data transfer to one OFIFO 512 of the output control unit 5. An instruction of data transfer to one OFIFO 512 can be issued by a microcode such as "add ilm[0], ilm[1], ofifo0", where add is an IPU arithmetic instruction that furnishes an arithmetic result of the IPU 1 to one OFIFO 512. Microcodes can be stored in an instruction RAM (not shown). A sequencer (not shown) can fetch and decode microcodes, and control the operation of each processing unit within the geometric arithmetic core 10. The last part of the above-mentioned microcode indicates the destination of the microcode; part of ofifo* marked with an asterisk (*) identifies which at least one processing unit, i.e., either the IPU 1 or at least one of the plurality of floating-point processing units FPU0 2a to FPU3 2d, is to transfer its or their arithmetic results to one OFIFO 512.

In accordance with the present invention, the destination code included in each microcode that can issue an instruction of data transfer to one OFIFO 512, i.e., the code indicating the transfer mode is comprised of four bits; bits 0 to 3 assigned to the plurality of floating-point processing units FPU0 to FPU3, respectively. When bit 0 is one, the geometric arithmetic core is held in transfer mode in which it can transfer an arithmetic result of the FPU0 2a to one OFIFO 512 by way of the OFIFO data transfer control unit. When bit 1 is one, the geometric arithmetic core is held in transfer mode in which it can transfer an arithmetic result of the FPU1 2b to one OFIFO 512 by way of the OFIFO data transfer control unit. When bit 2 is one, the geometric arithmetic core is held in transfer mode in which it can transfer an arithmetic result of the FPU2 2c to one OFIFO 512 by way of the OFIFO data transfer control unit. When bit 3 is one, the geometric arithmetic core is held in transfer mode in which it can transfer an arithmetic result of the FPU3 2d to one OFIFO 512 by way of the OFIFO data transfer control unit. When all the bits are one, the geometric arithmetic core is held in transfer mode in which it can transfer an arithmetic result of the IPU 1 to one OFIFO 512 by way of the OFIFO data transfer control unit. Thus the transfer mode setting section 42 can easily set the transfer mode according to the transfer mode signal Mode from the geometric arithmetic core 10 because the destination code is defined in each microcode. The sequencer not shown in the geometric arithmetic core decodes the code indicating the transfer mode and then furnishes the decoded code to either the IPU 1 or the plurality of floating-point processing units FPU0 2a to FPU3 2d associated with the destination code decoded. Either the IPU 1 or the plurality of floating-point processing units FPU0 2a to FPU3 2d then furnishes the transfer mode signal Mode, as well as IPUouse or FPUouse, to the OFIFO data transfer control unit 4. As previously mentioned, since the geometric arithmetic core 10 includes only one IPU, the transfer mode is automatically determined when the IPU 1 furnishes IPUouse. The IPU 1 thus does not need to furnish the transfer mode signal Mode.

Figure 5:
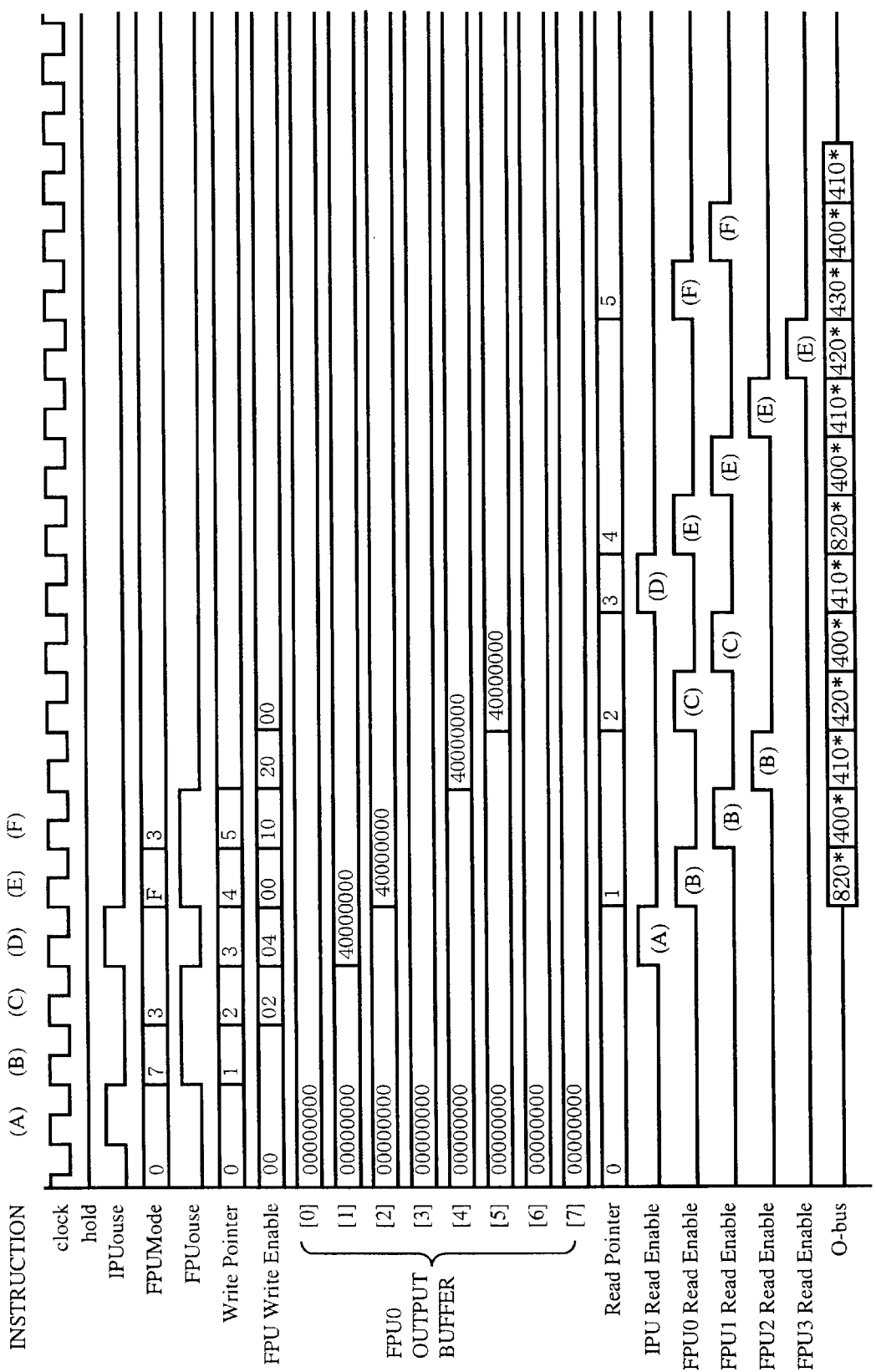
FIG. 5 is a timing chart showing a operation of reading data out of the data output buffers, and sending out the data on an O-bus, of the output FIFO data transfer control device according to the first embodiment of the present invention.

Next, a description will be made as to the operation of the output FIFO data transfer control device according to the first embodiment of the present invention with reference to FIGS. 4 and 5. FIGS. 4 and 5 are timing charts showing the operation of the output FIFO data transfer control device. In the following description, assume that instructions of data transfer to one OFIFO 512 are sequentially issued as follows:

(1) data transfer instruction (A); destination code ofifo0: from IPU to OFIFO (data 1)

(2) data transfer instruction (B); destination code ofifo7: from FPU0, FPU1, and FPU2 to OFIFO (data 2, 3, and 4)

(3) data transfer instruction (C); destination code ofifo3: from FPU0 and FPU1 to OFIFO (data 5 and 6)

(4) data transfer instruction (D); destination code ofifo0: from IPU to OFIFO (data 7)

(5) data transfer instruction (E); destination code ofifof: from FPU0, FPU1, FPU2, and FPU3 to OFIFO (data 8, 9, 10, and 11)

(6) data transfer instruction (F); destination code ofifo3: from FPU0 and FPU1 to OFIFO (data 12 and 13)

Each of the plurality of floating-point processing units FPU0 2a to FPU3 2d that operates according to SIMD instructions can process a plurality of data when one instruction is issued. Each of the plurality of data transfer instructions (A) to (F) shown can be issued by one microcode. For example, the data transfer instruction (B) directs FPU0, FPU1, and FPU2 to simultaneously perform arithmetic operations and to furnish their arithmetic results (i.e., data 2, 3, and 4) to one OFIFO 512 in the order of FPU0, FPU1, and FPU2. Such a process of sequentially furnishing a plurality of data to one OFIFO 512 is called parallel/serial transforming process.

Every time a microcode is executed and a data transfer instruction such as one of the plurality of data transfer instructions (A) to (F) as mentioned above is issued, either the IPU 1 or the plurality of floating-point processing units FPU0 2a to FPU3 2d associated with the data transfer instruction can furnish IPUouse or FPUouse to the OFIFO data transfer control unit 4. The write/read pointer generating section 41 of the OFIFO data transfer control unit 4 then generates a write pointer in response to IPUouse or FPUouse. When IPUouse becomes state 1, as shown in FIG. 4, the write/read pointer generating section 41 generates a write pointer having an initial value at state 0 and then furnishes the write pointer to the IPU 1 which is the sender of IPUouse. Every time the write/read pointer generating section 41 receives either IPUouse or FPUouse, that is, every time IPUouse or FPUouse is at state 1 in one clock cycle, the write/read pointer generating section 41 updates the write pointer by incrementing the write pointer by one and then furnishes the updated write pointer to the sender of either IPUouse or FPUouse.

Figure 6:
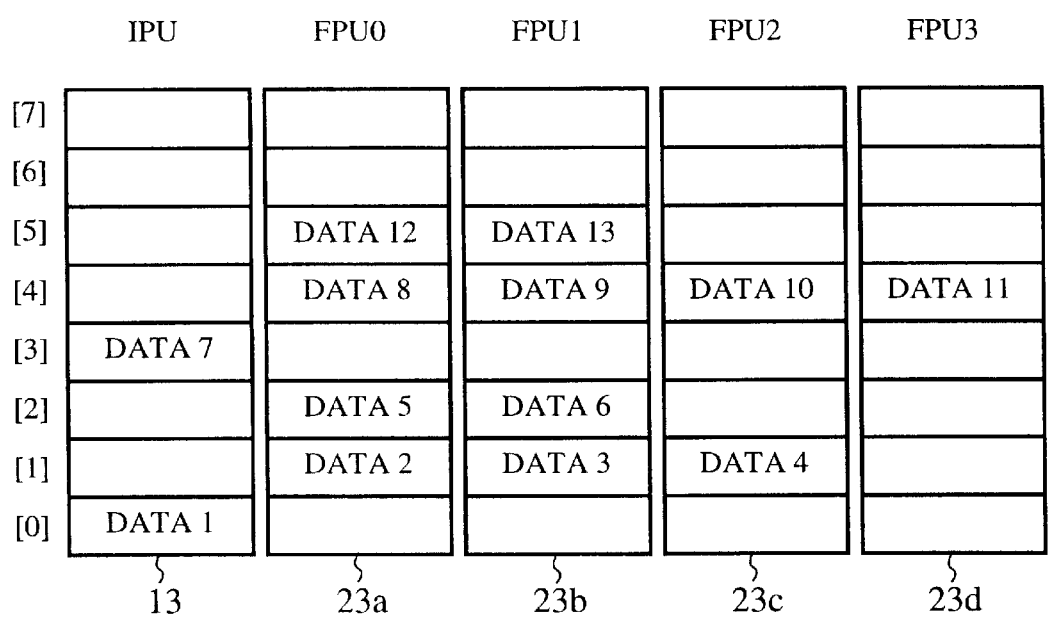
FIG. 6 is a diagram showing an example of locations where data are written into the data output buffers by the output FIFO data transfer control device according to the first embodiment of the present invention.

Either the IPU 1 or at least one of the plurality of floating-point processing units FPU0 2a to FPU3 2d, which is the sender of IPUouse or FPUouse, generates a write enable signal having a value other than zero within the processing unit, and writes data on its arithmetic result into a specific location within the data output buffer 13 or 23a, 23b, 23c, or 23d, which is identified by the write pointer furnished by the write/read pointer generating section 41. In the example as shown in FIG. 4, when the data transfer instruction (B) is issued, FPU0 2a to FPU2 2c generate respective write enable signals having a value (or address) of "02" and write respective arithmetic result data 2 to 4 into specific locations numbered 1 within their respective data output buffers 23a to 23c, which are identified by the write pointer having a value of "1" furnished by the write/read pointer generating section 41, as shown in FIG. 6. At that time, with the timing as shown in FIG. 4 those data are respectively written into the specific locations numbered 1 within the data output buffers 23a to 23c, which are identified by the write pointer. In this manner, every time each of the plurality of data transfer instructions (A) to (F) is issued in turn, the write/read pointer generating section 41 increments the write pointer by one, and at least one processing unit associated with each of the plurality of data transfer instructions stores an arithmetic result in a specific location within the data output buffer thereof in turn, which is identified by the write pointer. As a result, the plurality of data 1 to 13 are sequentially stored into the plurality of data output buffers 13, and 23a to 23d, as shown in FIG. 6.

The write/read pointer generating section 41 also generates a read pointer to read those data, which have been written according to the write pointer, from the plurality of data output buffers. The transfer mode setting section 42 writes transfer mode information, indicating which at least one processing unit (either IPU1 or at least one of the plurality of floating-point processing units FPU0 2a to FPU3 2d) is to transfer data to one OFIFO 512, into a buffer (not shown), according to the transfer mode signal Mode which the transfer mode setting section receives as well as IPUouse or FPUouse. The transfer mode setting section 42 then generates and furnishes a read enable signal (IPU read enable signal or FPU0 (or FPU1, FPU2, or FPU3) read enable signal) associated with the read pointer generated by the write/read pointer generating section 41 to either the IPU 1 or at least one of the plurality of floating-point processing units FPU0 2a to FPU3 2d, which is identified by the transfer mode information. In the above example, the transfer mode setting section 42 furnishes an IPU read enable signal associated with the instruction (A) of data transfer to one OFIFO 512 to the IPU 1 first, as shown in FIG. 5. After that, at every clock cycle, the transfer mode setting section 42 sequentially furnishes FPU0 to FPU2 read enable signals associated with the instruction (B) of data transfer to one OFIFO 512 to the FPU0 2a to FPU2 2c, respectively, FPU0 and FPU1 read enable signals associated with the instruction (C) of data transfer to one OFIFO 512 to the FPU0 2a and FPU1 2b, an IPU read enable signal associated with the instruction (D) of data transfer to one OFIFO 512 to the IPU 1, FPU0 to FPU 3 read enable signals associated with the instruction (E) of data transfer to one OFIFO 512 to the FPU0 2a to FPU3 2d, and FPU0 and FPU 1 read enable signals associated with the instruction (F) of data transfer to one OFIFO 512 to the FPU0 2a and FPU1 2b.

When either the IPU 1 or at least one of the plurality of floating-point processing units FPU0 2a to FPU3 2d receives an read enable signal applied thereto, it reads data out of a specific location within its data output buffer, which is identified by the read pointer, as shown in FIG. 5, and then furnishes the data onto the O-bus 3. After the transfer mode setting section 42 has finished generating all read enable signals associated with one data transfer instruction according to the transfer mode signal Mode and all data associated with the data transfer instruction have appeared on the O-bus 3, the write/read pointer generating section 41 increments the read pointer by one.

When the data that has been sent out on the O-bus 3 by one processing unit is an address, the O-bus data input section 44 writes the data into its address register (not shown). Otherwise, the O-bus data input section 44 writes the data into its data register (not shown), and increments the previous address which it generated before receiving the data by one and writes the address into the address register. The data output section 46 generates and furnishes a Valid flag indicating whether or not the value of the data register within the O-bus data input section 44 is valid, an address flag indicating whether or not the data temporarily stored in the O-bus data input section 44 is an address, and a final flag indicating whether or not the data is the last one of each burst, to the output control unit 5 including the plurality of OFIFOs 512, as well as the data. The final flag is also a kickoff signal for triggering the output control unit 5 to transfer the data to outside the device by way of the secondary bus 6.

The WCR control section 45 includes a register (WCR) for storing the value of a transfer word counter, the value showing the size of each burst of data transfer to the output control unit 5. The user can set the value of the register to an arbitrary value using a microcode. As an alternative, a host CPU (not shown) can set the value of the register. Data transfer to one OFIFO 512 of the output control unit 5 can be performed in units of a burst comprised of (one address+N data). In this case, the value of the transfer word counter (i.e., the value of WCR) is (N+1).

The Full flag checking section 43 checks whether or not each of the plurality of OFIFOs 512 is full, based on the Full flag furnished by the output control unit 5. When it is determined that each of the plurality of OFIFOs 512 is full, the Full flag checking section 43 stops the data transfer to the output control unit 5.

Figure 23:
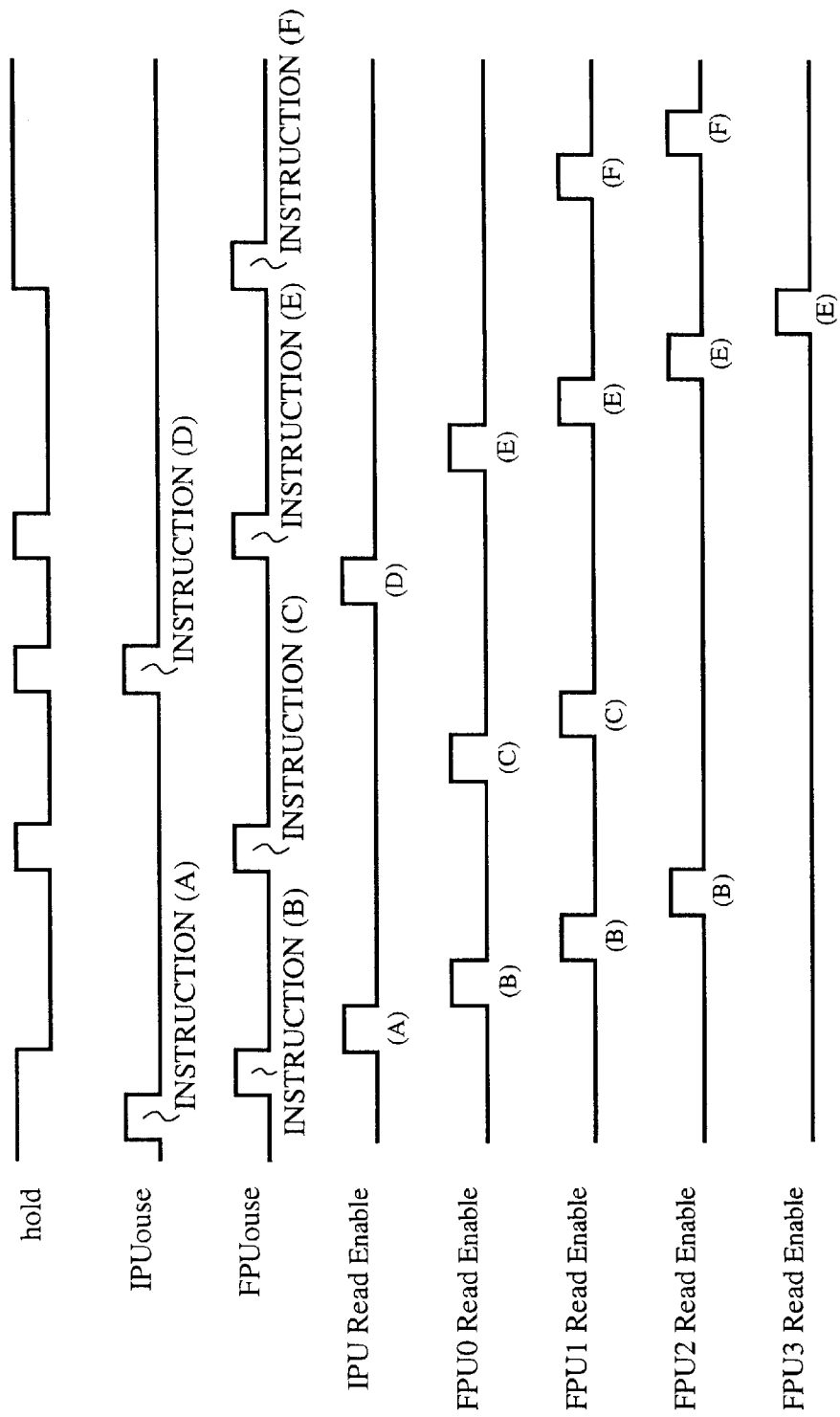
FIG. 23 is a timing chart showing the operation of the prior art output FIFO data transfer control device.

Next, a description will be made as to the comparison between the operations of the output FIFO data transfer control device according to the first embodiment of the present invention and the prior art output FIFO data transfer control device mentioned above, with reference to the timing chart showing the operation of the prior art output FIFO data transfer control device, as shown in FIG. 23. When plural arithmetic instructions are continuously issued for the same processing unit, as the two successive data transfer instructions (B) and (C) are sequentially issued in the above example, a plurality of data processed according to an SIMD instruction will be sent out on the single O-bus. Therefore, when the next instruction is issued before all data on arithmetic results are read out of one or more processing units that have performed arithmetic operations according to the previous instruction, data registers for storing the arithmetic results, such as a DRFA and a DRFM, can be overwritten with new data. To prevent the overwriting of old data with new data, the geometric arithmetic core 10 has to be caused to enter the wait state by making a hold signal become state 0, as shown in FIG. 23. Every time a data transfer instruction is executed, either the IPU 1 or at least one of the plurality of floating-point processing units FPU0 2a to FPU3 2d, which is associated with the data transfer instruction, furnishes IPUouse or FPUouse to the data transfer control unit 4, and the hold signal is asserted at state 0. The OFIFO data transfer control unit 4 sequentially furnishes one or more read enable signals so as to read data out of one or more corresponding processing units associated with the data transfer instruction. The prior art data transfer control device thus needs much time required for data transfer because it has to cause the geometric arithmetic core 10 to enter the wait state when plural arithmetic instructions are continuously issued for the same processing unit.

In contrast, every time a data transfer instruction is issued in the geometric arithmetic core 10, the output FIFO data transfer control device according to the first embodiment of the present invention can store data associated with the instruction in an empty area within the data output buffer of at least one processing unit associated with the data transfer instruction, as shown in FIG. 4, and then read the data out of the data output buffer of at least the processing unit (i.e., the IPU 1 or at least one of the plurality of floating-point processing units FPU0 2a to FPU3 2d) associated with the data transfer instruction so as to transfer the data to one OFIFO 512, without having to cause the geometric arithmetic core 10 to enter the wait state by activating the hold signal, as shown in FIG. 5.

As previously mentioned, the output FIFO data transfer control device according to the first embodiment of the present invention can transfer data at a high speed without having to cause the geometric arithmetic core 10 to enter the wait state and stop instruction pipeline processing. Especially, the incorporation of the output FIFO data transfer control device according to the first embodiment into parallel processing LSIs, which need to perform geometric arithmetic processing for 3D graphics at a high speed, makes it possible to perform data transfer at a high speed in parallel with the instruction pipeline processing without having to stop the instruction pipeline processing, thus speeding up the geometric arithmetic processing for 3D graphics.

Second Embodiment

Figure 7:
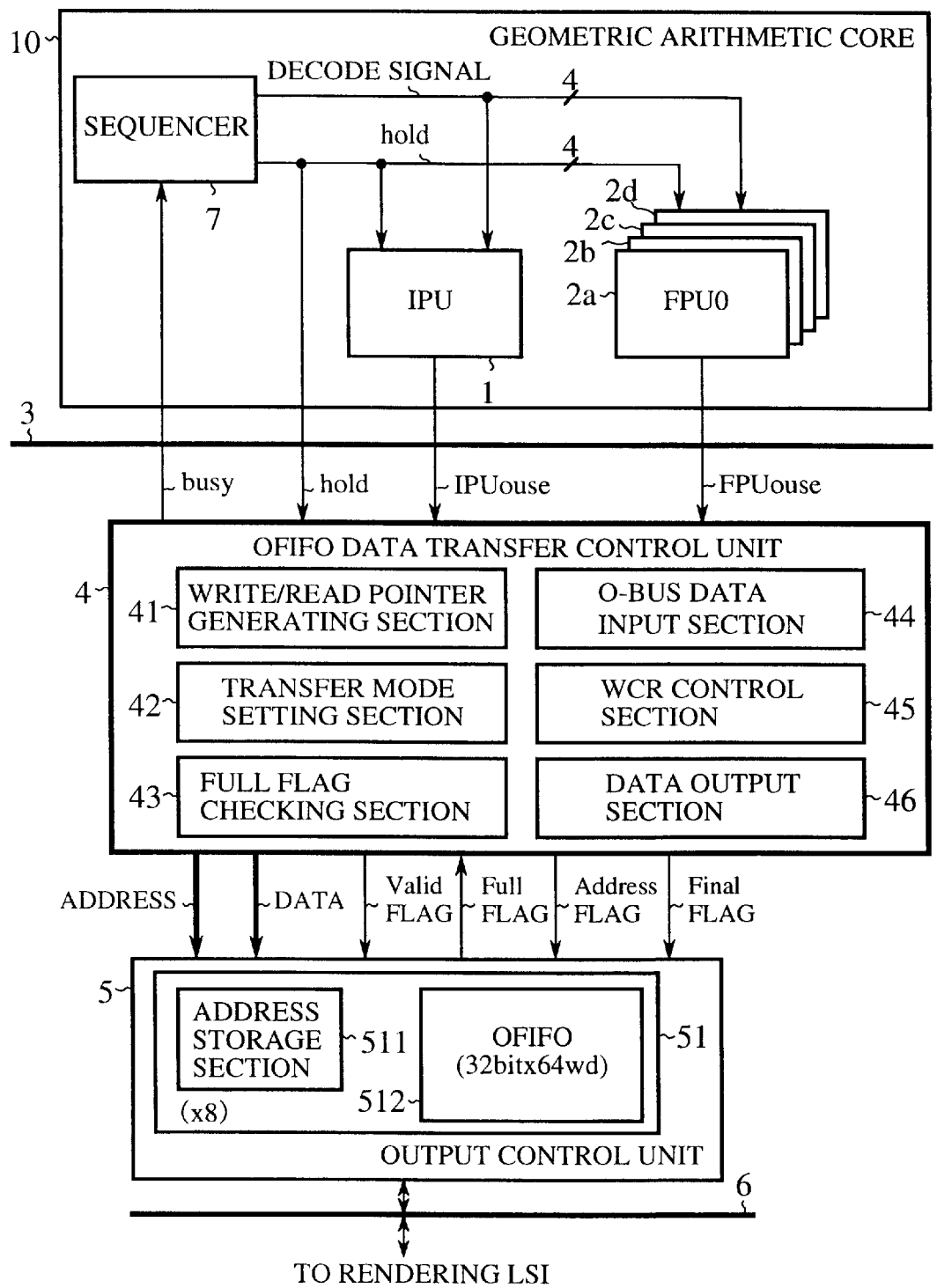
FIG. 7 is a block diagram showing the structure of an output FIFO data transfer control device according to a second embodiment of the present invention.

Referring next to FIG. 7, there is illustrated a block diagram showing the structure of an output FIFO data transfer control device according to a second embodiment of the present invention. In the figure, the same reference numerals as shown in FIG. 1 designate the same components as those of the output FIFO data transfer control device of the aforementioned first embodiment or like components, and therefore the description of the components will be omitted hereinafter. In FIG. 7, reference numeral 7 denotes a sequencer built in a geometric arithmetic core 10, for asserting a hold signal so as to stop instruction pipeline processing when an instruction of data transfer to one OFIFO 512 is issued during a busy signal furnished by an OFIFO data transfer control unit 4 is asserted, that is, when a data transfer instruction signal IPUouse or FPUouse signal is sent out. The OFIFO data transfer control unit 4 of the output FIFO data transfer control device of the second embodiment includes a write/read pointer generating section 41 that can generate the busy signal indicating that the data output buffer included in each processing unit within the geometric arithmetic core 10 is full, according to a relationship between a write pointer and a read pointer generated by the write/read pointer generating section 41, so as to inhibit the writing of data into the data output buffer of each processing unit.

Since the basic operation of the output FIFO data transfer control device according to the second embodiment of the present invention is the same as that of the output FIFO data transfer control device of the aforementioned first embodiment, a description will be made as to only the difference between them.

When the sum of the write pointer and 1 is equal to the read pointer (this case will be referred to as a busy condition), the write/read pointer generating section 41 of the OFIFO data transfer control unit 4 generates and furnishes the busy signal to inhibit the writing of data into the data output buffer of each processing unit to the sequencer 7 of the geometric arithmetic core 10 so that data stored in the data output buffer of each processing unit within the geometric arithmetic core 10, which has not been read out yet, will not be overwritten with new data. When a instruction of data transfer to one OFIFO 512 is issued and IPUouse or FPUouse is then furnished during the sequencer 7 receives the busy signal asserted, the sequencer 7 asserts the hold signal to cause the geometric arithmetic core 10 to enter the wait state in which it stops the instruction pipeline processing. When the IPU 1 and the plurality of floating-point processing units FPU0 2a to FPU3 2d receive the hold signal asserted from the sequencer 7, they stop the write operations of writing data into their respective data output buffers. Since the OFIFO data transfer control unit 4 operates independently of the geometric arithmetic core 10 that performs the instruction pipeline processing, it is not necessary to stop the read operation of reading data from the data output buffer of each processing unit, which is carried out under control of the OFIFO data transfer control unit 4, even though the sequencer 7 asserts the hold signal.

Figure 8:
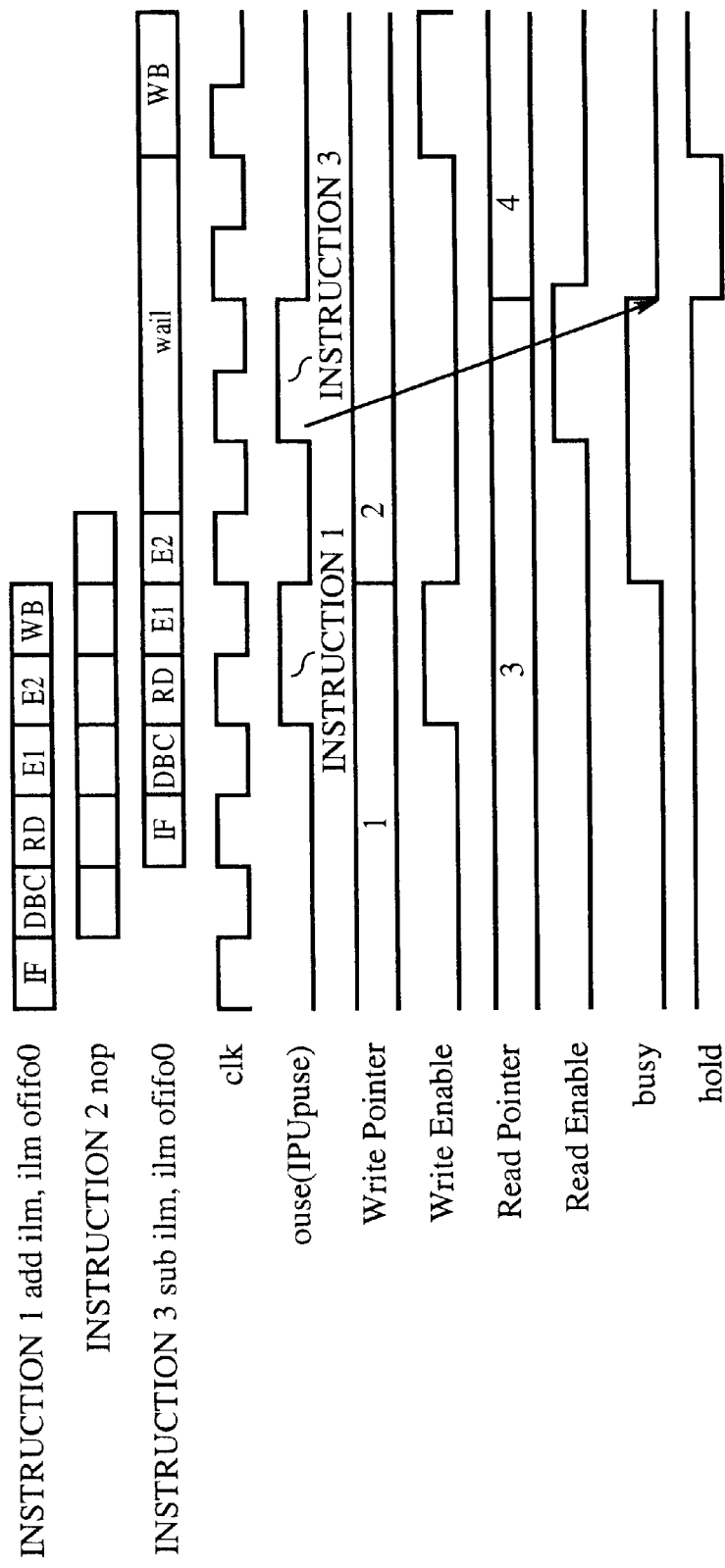
FIG. 8 is a timing chart showing a operation of inhibiting writing of data into the data output buffers, of the output FIFO data transfer control device according to the second embodiment of the present invention.
Figure 9:
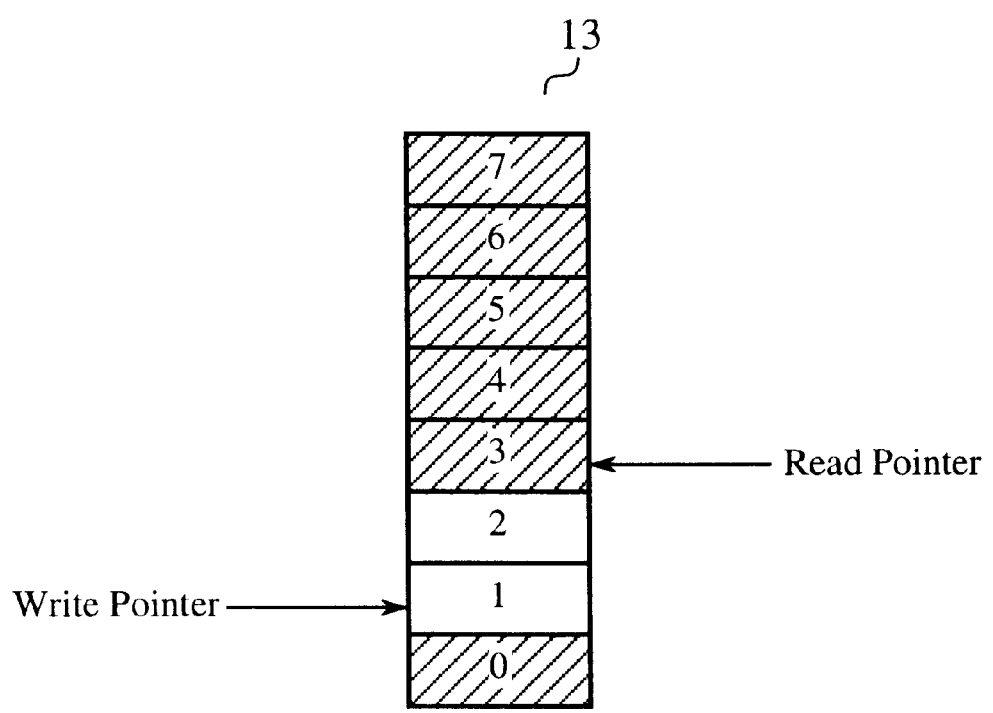
FIG. 9 is a diagram showing a relationship between a write pointer and a read pointer before execution of an instruction 3 as shown in FIG. 8.
Figure 10:
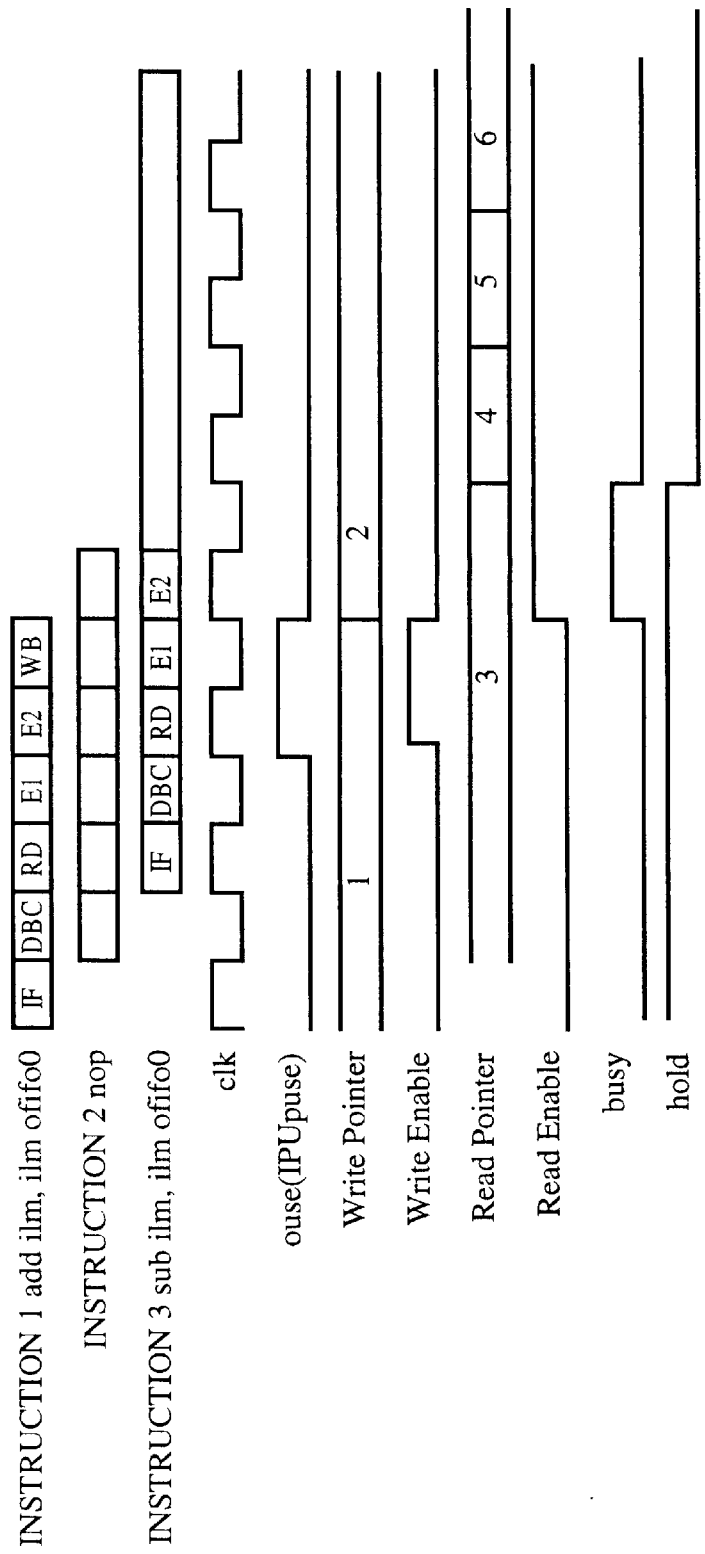
FIG. 10 is a timing chart showing a operation of the output FIFO data transfer control device according to the second embodiment of the present invention when a hold signal is asserted because of a cause other than an objective of stopping writing of data into the data output buffers.

A detailed description will be made as to the operation of the output FIFO data transfer control device according to the second embodiment, with reference to FIGS. 8 to 10. In the following description, assume that the data output buffer 13 of the IPU 1 has contents as shown in FIG. 9 before an instruction 1 as shown in FIG. 8 is issued. Further, assume that data stored in locations hatched are not sent out on the O-bus 3 yet, and the write pointer is 1 and the read pointer is 3. When the instruction 1 is issued, an arithmetic result produced by the "add" instruction is written into a specific location within the data output buffer 13, which is identified by the write pointer having a value of 1. The write pointer is then incremented by one and becomes 2. At that time, since the read pointer is 3 and is therefore equal to the sum of the write pointer and 1, the write/read pointer generating section 41 asserts the busy signal.

When an instruction 3 is issued and the IPUouse signal is asserted after the sequencer 7 has received the busy signal asserted from the write/read pointer generating section 41, the sequencer 7 asserts the hold signal. In the second embodiment, assume that the hold signal is active low, and each processing unit, such as the IPU 1, is set (i.e., stops the instruction pipeline processing) when the hold signal is at its low state and is reset when the hold signal is at its high state. Needless to say, the hold signal can be alternatively active high. When the hold signal is asserted low, the IPU 1 enters the wait state in which it stops the write operation of writing an arithmetic result produced by the execution of the instruction 3 into the data output buffer 13. After that, when the write/read pointer generating section 41 increments the read point by one so that the busy condition is not established, it places the busy signal in its inactive state by making the busy signal go low. As a result, the sequencer 7 negates the hold signal, so that the IPU 1 can write the arithmetic result produced by the execution of the instruction 3 into the data output buffer 13.

Even though a cause other than the establishment of the busy condition asserts the hold signal to stop the write operation of writing data into the data output buffer of each processing unit and therefore the geometric arithmetic core 10 enters the wait state, the output FIFO data transfer control device can read data from the data output buffer of each processing unit and furnish the data onto the O-bus 3 and hence to one OFIFO 512 of the output control unit 5 because the output FIFO data transfer control device of the second embodiment operates independently of the instruction pipeline processing.

As previously mentioned, the output FIFO data transfer control device according to the second embodiment of the present invention can transfer data at a high speed while preventing the overwriting of data into the data output buffer of each processing unit without having to cause the geometric arithmetic core 10 to enter the wait state and stop the instruction pipeline processing.

Third Embodiment

Figure 11:
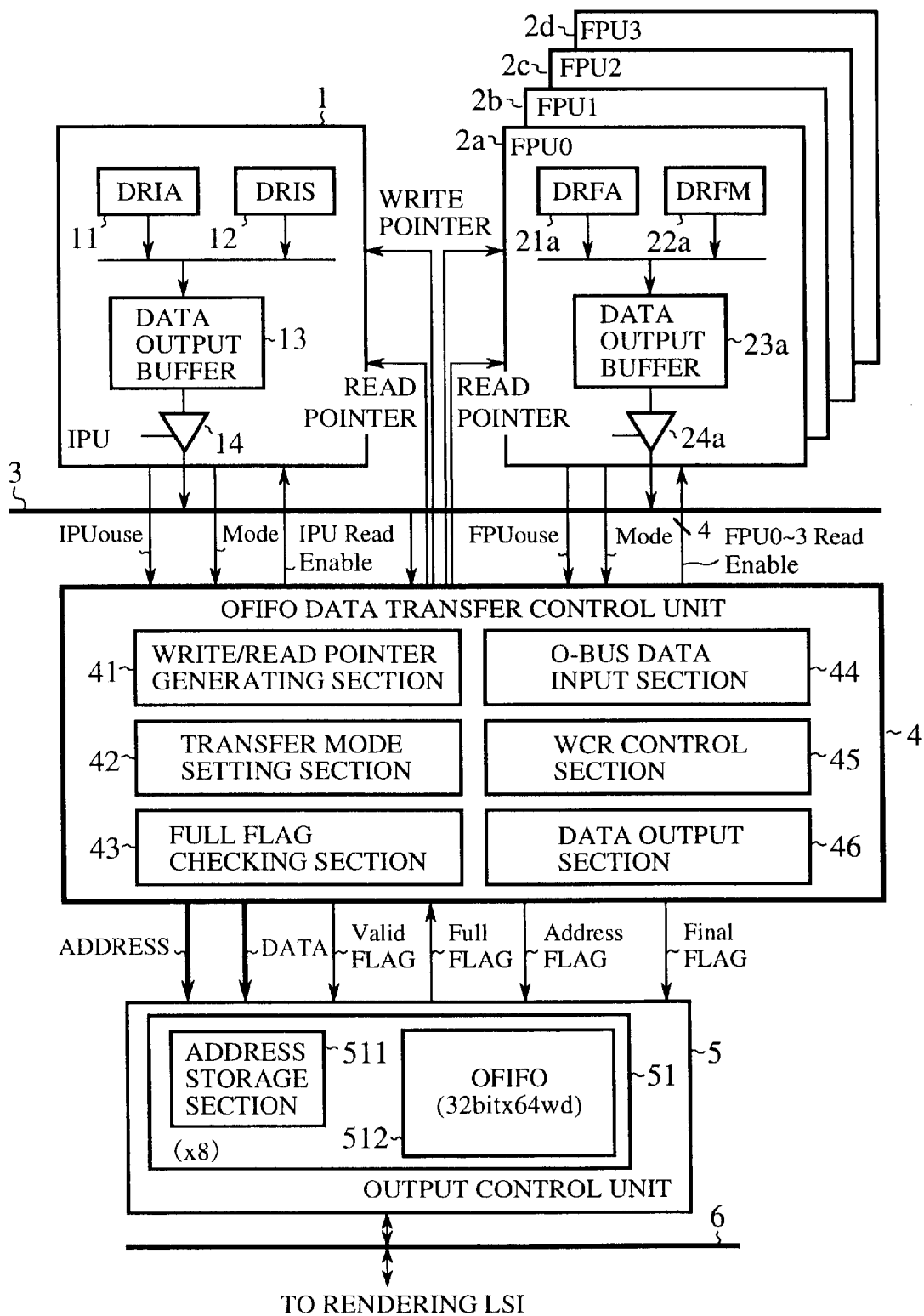
FIG. 11 is a block diagram showing the structure of an output FIFO data transfer control device according to a third embodiment of the present invention.

Referring next to FIG. 11, there is illustrated a block diagram showing the structure of an output FIFO data transfer control device according to a third embodiment of the present invention. In the figure, the same reference numerals as shown in FIG. 1 designate the same components as those of the output FIFO data transfer control device of the aforementioned first embodiment or like components, and therefore the description of the components will be omitted hereinafter. In FIG. 11, reference numeral 410 denotes a write/read pointer generating section, responsive to a data transfer instruction signal IPUouse from an IPU 1, for generating and furnishing a write pointer associated with the IPU 1 to the IPU 1, the write pointer identifying a specific location where data on an arithmetic result from the IPU 1 is to be written into a data output buffer of the IPU 1. The write/read pointer generating section 410 also generates and furnishes a read pointer associated with the IPU 1 to the IPU 1, the read pointer identifying a specific location where data, which is written into the data output buffer 13 of the IPU 1 according to the write pointer, is to be read out of the data output buffer 13. In response to a data transfer instruction signal FPUouse from a plurality of floating-point processing units FPU0 2a to FPU3 2d, the write/read pointer generating section 410 generates and furnishes another write pointer associated with the plurality of floating-point processing units FPU0 2a to FPU3 2d to the plurality of floating-point processing units FPU0 2a to FPU3 2d, the other write pointer identifying a specific location where data on an arithmetic result from at least one of the plurality of floating-point processing units is to be stored in a data output buffer of at least one of the plurality of floating-point processing units. The write/read pointer generating section 410 also generates and furnishes another read pointer associated with the plurality of floating-point processing units FPU0 2a to FPU3 2d to the plurality of floating-point processing units FPU0 2a to FPU3 2d, the other read pointer identifying a specific location where data, which has been written into the data output buffer of at least one of the plurality of floating-point processing units, is to be read out of the data output buffer of at least one of the plurality of floating-point processing units FPU0 2a to FPU3 2d.

As previously mentioned, since the output FIFO data transfer control unit according to the aforementioned first embodiment includes the write/read pointer generating section 41 for generating one set of a write pointer and a read pointer for use in common with the IPU 1 and the plurality of floating-point processing units FPU0 2a to FPU3 2d, the data output buffer of each processing unit can have many empty areas, as shown in FIG. 6. To solve the problem, the write/read pointer generating section 410 of this embodiment generates one set of a write pointer and a read pointer for use with the IPU 1 as well as another set of a write pointer and a read pointer for use with the plurality of floating-point processing units FPU0 2a to FPU3 2d.

Since the basic operation of the output FIFO data transfer control device according to the third embodiment of the present invention is the same as that of the output FIFO data transfer control device of the aforementioned first embodiment, a description will be made as to only the difference between them.

As previously explained in First Embodiment, every time a microcode is executed and a data transfer instruction such as one of the plurality of data transfer instructions (A) to (F) as mentioned above is issued, either the IPU 1 or the plurality of floating-point processing units FPU0 2a to FPU3 2d associated with the data transfer instruction furnishes IPUouse or FPUouse to the OFIFO data transfer control unit 4. In response to IPUouse or FPUouse, the write/read pointer generating section 410 of the OFIFO data transfer control unit 4 generates a write pointer associated with the sender of IPUouse or FPUouse. When IPUouse becomes state 1, as shown in FIG. 4, the write/read pointer generating section 410 generates a write pointer associated with the IPU 1, having an initial value at state 0 and then furnishes the write pointer to the IPU 1 which is the sender of IPUouse. After that, every time the write/read pointer generating section 410 receives IPUouse, that is, every time IPUouse is at state 1 in one clock cycle, the write/read pointer generating section 410 updates the write pointer associated with the IPU 1 by incrementing the write pointer by one and then furnishes the updated write pointer to the IPU 1.

Then, when a data transfer instruction (B) is issued, for example, and FPUouse becomes state 1 and the transfer mode signal Mode has a value of 7, as shown in FIG. 4, the write/read pointer generating section 410 generates another write pointer associated with FPU, having an initial value at state 0 and then furnishes the other write pointer to the plurality of floating-point processing units FPU0 2a to FPU3 2d. Every time the write/read pointer generating section 410 receives FPUouse, that is, every time FPUouse is at state 1 in one clock cycle, the write/read pointer generating section 410 updates the other write pointer associated with FPU by incrementing the other write pointer by one and then furnishes the updated write pointer to the plurality of floating-point processing units FPU0 2a to FPU3 2d.

Figure 12:
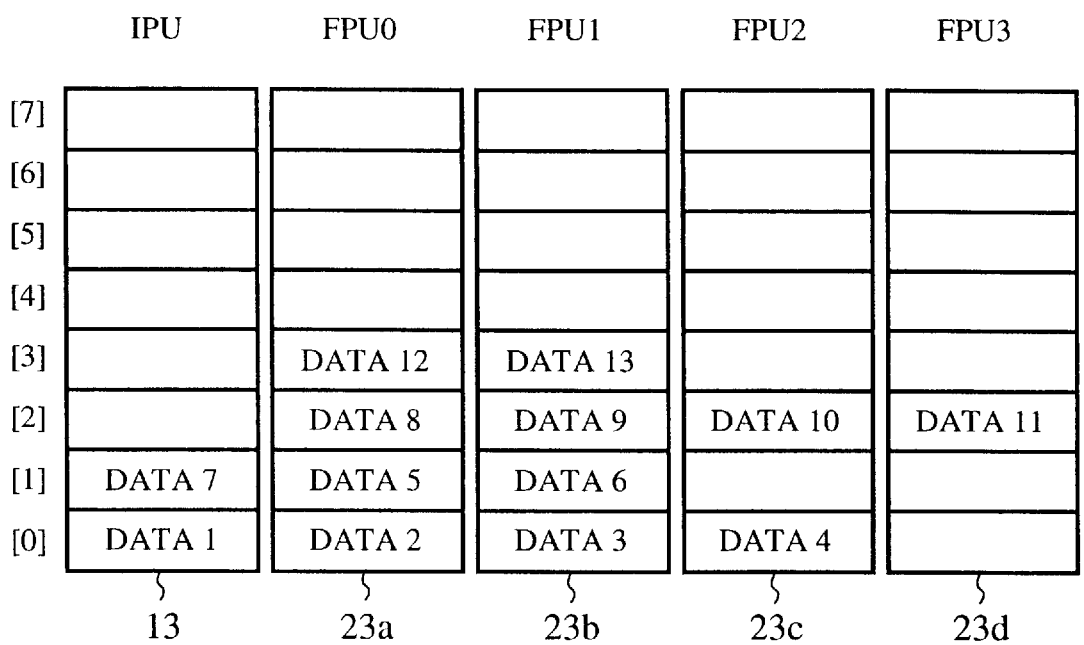
FIG. 12 is a diagram showing an example of locations where data are written into the data output buffers by the output FIFO data transfer control device according to the third embodiment of the present invention.

In this manner, every time a data transfer instruction, associated with the IPU 1 or at least one of the plurality of floating-point processing units FPU0 2a to FPU3 2d is issued, the write/read pointer generating section 410 increments the write pointer associated with IPU or FPU, and at least one processing unit associated with the data transfer instruction in turn stores an arithmetic result in a specific location within the data output buffer thereof, which is identified by the write pointer. As a result, the plurality of data 1 to 13 can be sequentially stored into the plurality of data output buffers 13, and 23a to 23d, as shown in FIG. 12.

The write/read pointer generating section 410 also generates two read pointers associated with IPU and FPU to read those data, which have been written according to the two write pointers associated with IPU and FPU, from the plurality of data output buffers. When the transfer mode setting section 42 generates and furnishes all read enable signals associated with each issued data transfer instruction according to the transfer mode signal Mode and all data associated with the data transfer instruction appear on the O-bus 3, the write/read pointer generating section 410 increments the read pointer for IPU or FPU, which is associated with the data transfer instruction, by one.

As previously mentioned, the output FIFO data transfer control device according to the third embodiment of the present invention can prevent empty areas from appearing within the data output buffer of the IPU 1. The output FIFO data transfer control device can also reduce the number of empty areas that appear within the data output buffer of each FPU. The output FIFO data transfer control device can thus transfer data at a high speed.

Preferably, the output FIFO data transfer control device can generate a set of a write pointer and a read pointer for each FPU, thus preventing empty areas from appearing within the data output buffer of each FPU.

Fourth Embodiment

Figure 13:
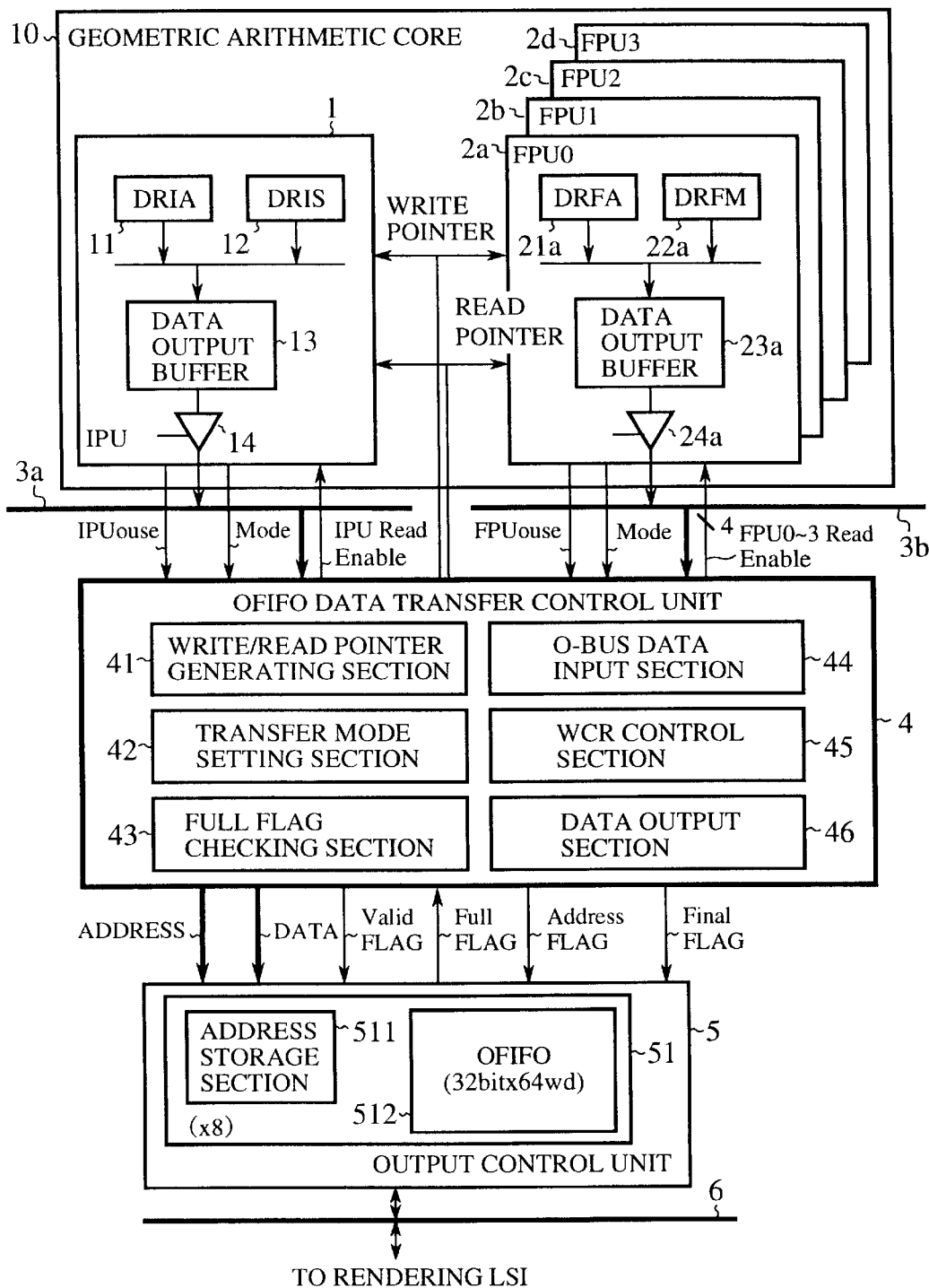
FIG. 13 is a block diagram showing the structure of an output FIFO data transfer control device according to a fourth embodiment of the present invention.

Referring next to FIG. 13, there is illustrated a block diagram showing the structure of an output FIFO data transfer control device according to a fourth embodiment of the present invention. In the figure, the same reference numerals as shown in FIG. 1 designate the same components as those of the output FIFO data transfer control device of the aforementioned first embodiment or like components, and therefore the description of the components will be omitted hereinafter. In FIG. 13, 3a denotes an output bus or O-bus for use with an IPU 1, and 3b denotes another output bus or O-bus for use with a plurality of floating-point processing units FPU0 2a to FPU3 2d.

Since the basic operation of the output FIFO data transfer control device according to the fourth embodiment of the present invention is the same as that of the output FIFO data transfer control device of the aforementioned first embodiment, a description will be made as to only the difference between them.

Figure 14:
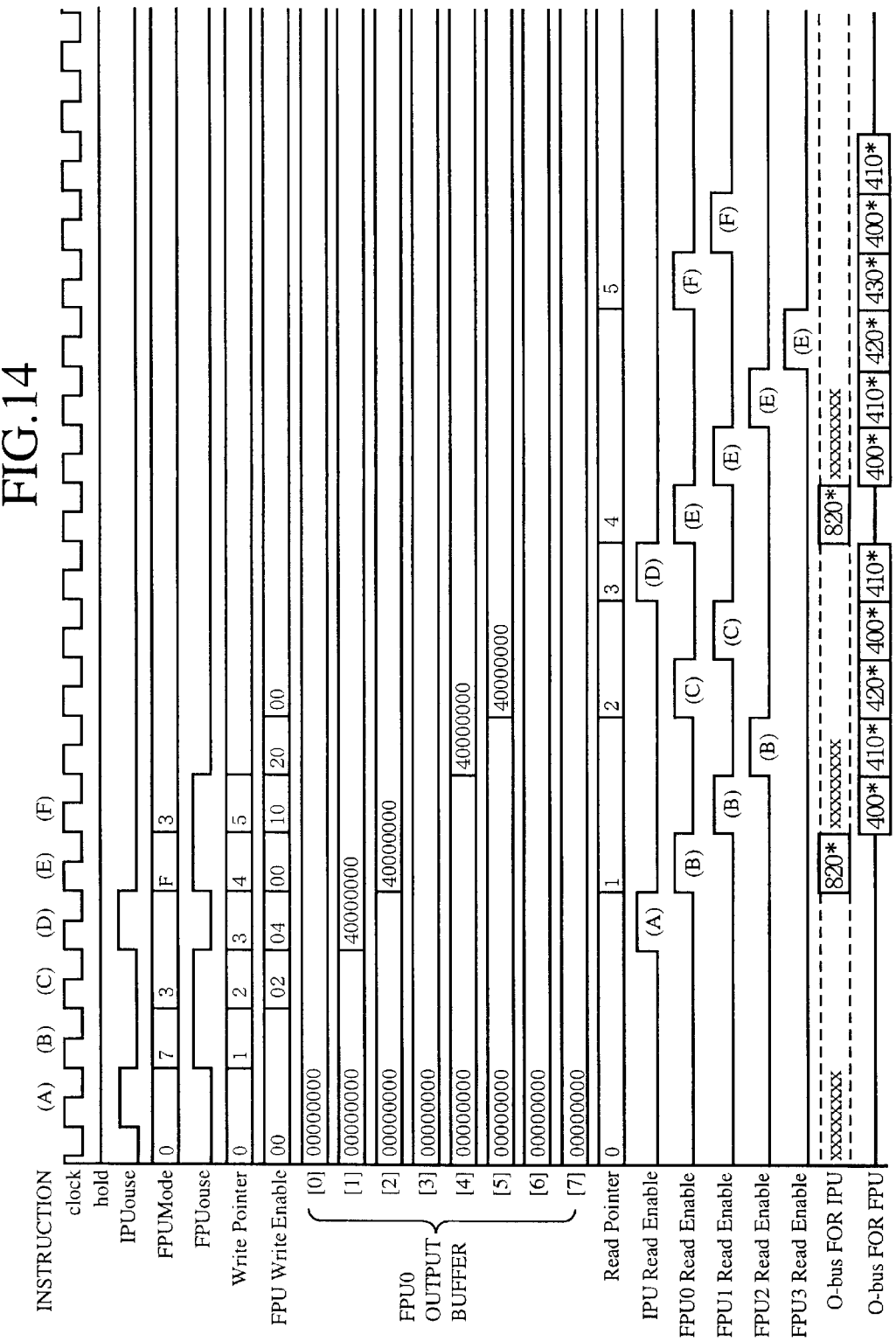
FIG. 14 is a timing chart showing a operation of reading data out of the data output buffers, and sending out the data on the O-bus, of the output FIFO data transfer control device according to the fourth embodiment of the present invention.

As previously explained in First Embodiment, every time a microcode is executed and a data transfer instruction such as one of the plurality of data transfer instructions (A) to (F) as mentioned above is issued, either the IPU 1 or at least one of the plurality of floating-point processing units FPU0 2a to FPU3 2d associated with the data transfer instruction writes an arithmetic result into its own data output buffer. After that, when either the IPU 1 or at least one of the plurality of floating-point processing units FPU0 2a to FPU3 2d associated with the data transfer instruction receives a read enable signal, it reads data from a specific location within its own data output buffer, which is identified by a read pointer, and then sends out the data on the first or second O-bus 3a or 3b for IPU or FPU. FIG. 14 is a timing chart showing an example of the operation of the output FIFO data transfer control device of the fourth embodiment.

As previously mentioned, the output FIFO data transfer control device according to the fourth embodiment of the present invention includes the first and second O-buses 3a and 3b for IPU and FPU. Accordingly,the output FIFO data transfer control device can process a number of data at a time while transferring data to a plurality of OFIFOs 512 at a high speed.

Fifth Embodiment

Figure 15:
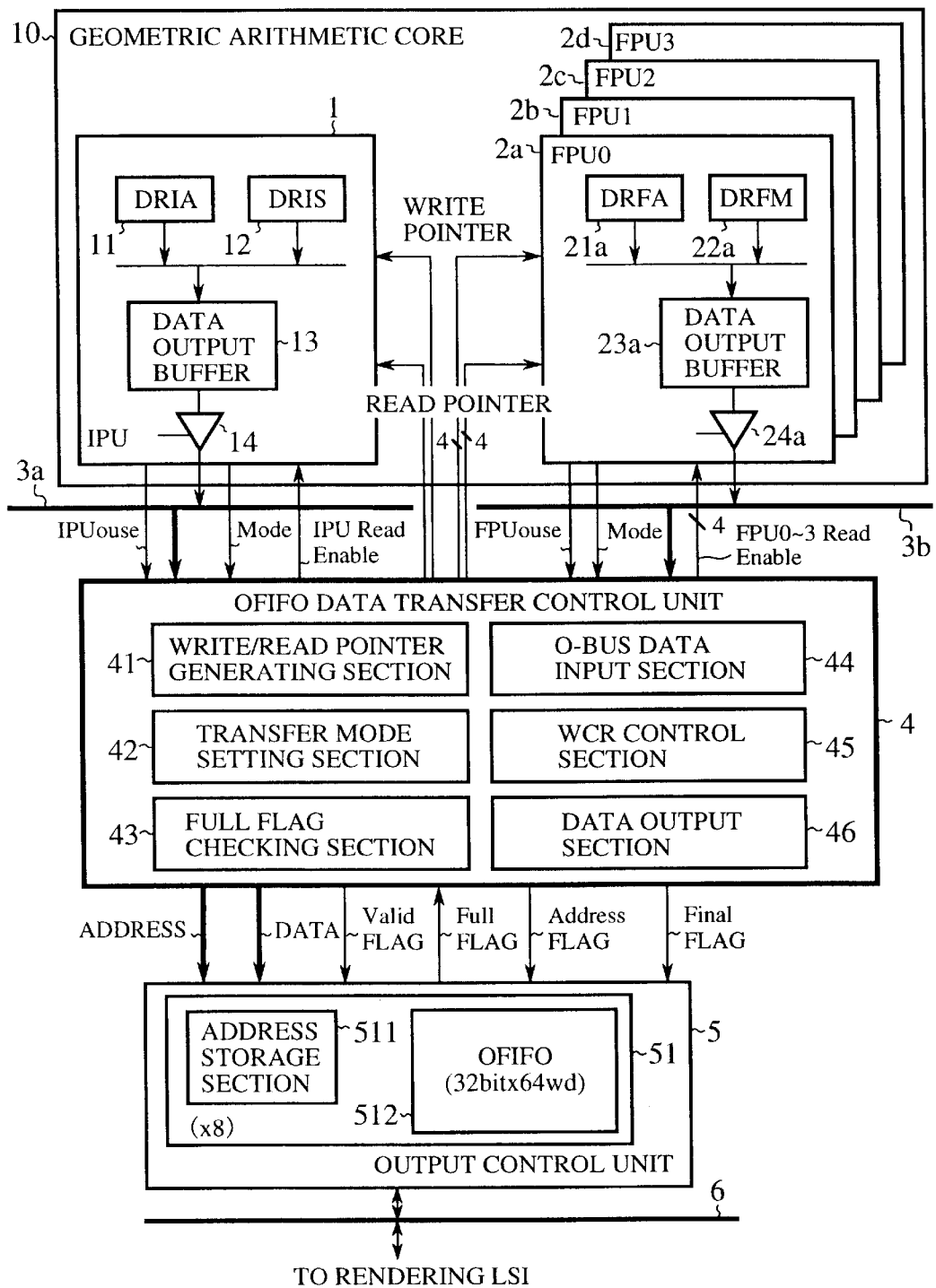
FIG. 15 is a block diagram showing the structure of an output FIFO data transfer control device according to a fifth embodiment of the present invention.

Referring next to FIG. 15, there is illustrated a block diagram showing the structure of an output FIFO data transfer control device according to a fifth embodiment of the present invention. In the figure, the same reference numerals as shown in FIGS. 11 and 13 designate the same components as those of the output FIFO data transfer control devices of the aforementioned third and fourth embodiments or like components, and therefore the description of the components will be omitted hereinafter. As can be seen from FIG. 15, the output FIFO data transfer control device according to the fifth embodiment includes an output bus or O-bus 3a for use with an IPU 1, and another output bus or O-bus 3b for use with a plurality of floating-point processing units FPU0 2a to FPU3 2d. An OFIFO data transfer control unit 4 includes a write/read pointer generating section 410, responsive to a data transfer instruction signal IPUouse from an IPU 1, for generating and furnishing a write pointer associated with the IPU 1 to the IPU 1, the write pointer identifying a specific location where data on an arithmetic result from the IPU 1 is to be written into a data output buffer 13 of the IPU 1. The write/read pointer generating section 410 also generates and furnishes a read pointer associated with the IPU 1 to the IPU 1, identifying a specific location where data, which is written into the data output buffer 13 of the IPU 1 according to the write pointer, is to be read out of the data output buffer 13. In response to a data transfer instruction signal FPUouse from the plurality of floating-point processing units FPU0 2a to FPU3 2d, the write/read pointer generating section 410 generates and furnishes another write pointer associated with the plurality of floating-point processing units FPU0 2a to FPU3 2d to the plurality of floating-point processing units FPU0 2a to FPU3 2d, the other write pointer identifying a specific location where data on an arithmetic result from at least one of the plurality of floating-point processing units is to be written into a data output buffer of at least one of the plurality of floating-point processing units. The write/read pointer generating section 410 also generates and furnishes another read pointer associated with the plurality of floating-point processing units FPU0 2a to FPU3 2d to the plurality of floating-point processing units, the other read pointer identifying a specific location where data, which is written into the data output buffer of at least one of the plurality of floating-point processing units, is to be read out of the data output buffer of at least one of the plurality of floating-point processing units FPU0 2a to FPU3 2d.

Since the basic operation of the output FIFO data transfer control device according to the fifth embodiment of the present invention is the same as that of the output FIFO data transfer control device of the aforementioned first embodiment, a description will be made as to only the difference between them.

As previously explained in First Embodiment, every time a microcode is executed and a data transfer instruction such as one of the plurality of data transfer instructions (A) to (F) as mentioned above is issued, either the IPU 1 or the plurality of floating-point processing units FPU0 2a to FPU3 2d associated with the data transfer instruction furnishes IPUouse or FPUouse to the OFIFO data transfer control unit 4. In response to IPUouse or FPUouse, the write/read pointer generating section 410 of the OFIFO data transfer control unit 4 generates a write pointer associated with the sender of IPUouse or FPUouse. When IPUouse becomes state 1, as shown in FIG. 4, the write/read pointer generating section 410 generates a write pointer associated with the IPU 1, having an initial value at state 0 and then furnishes the write pointer to the IPU 1 which is the sender of IPUouse. After that, every time the write/read pointer generating section 410 receives IPUouse, that is, every time IPUouse is at state 1 in one clock cycle, the write/read pointer generating section 410 updates the write pointer associated with the IPU 1 by incrementing the write pointer by one and then furnishes the updated write pointer to the IPU 1.

Then, when a data transfer instruction (B) is issued, for example, and FPUouse becomes state 1 and the transfer mode signal Mode has a value of 7, as shown in FIG. 4, the write/read pointer generating section 410 generates another write pointer associated with FPU, having an initial value at state 0 and then furnishes the other write pointer to the plurality of floating-point processing units FPU0 2a to FPU3 2d. After that, every time the write/read pointer generating section 410 receives FPUouse, that is, every time FPUouse is at state 1 in one clock cycle, the write/read pointer generating section 410 updates the other write pointer associated with FPU by incrementing the other write pointer by one and then furnishes the updated write pointer to the plurality of floating-point processing units FPU0 2a to FPU3 2d.

In this manner, every time a data transfer instruction, associated with the IPU 1 or at least one of the plurality of floating-point processing units FPU0 2a to FPU3 2d is issued, the write/read pointer generating section 410 increments the write pointer associated with IPU or FPU, and at least one processing unit associated with the issued data transfer instruction stores an arithmetic result in a specific location within the data output buffer thereof, which is identified by the write pointer. As a result, the plurality of data 1 to 13 can be sequentially stored into the plurality of data output buffers 13, and 23a to 23d, as shown in FIG. 12.

The write/read pointer generating section 410 also generates two read pointers associated with IPU and FPU to read those data, which have been written according to the two write pointers associated with IPU and FPU, from the plurality of data output buffers, and send out the data on the first and second O-buses 3a and 3b for IPU and FPU. When the transfer mode setting section 42 generates and furnishes all read enable signals associated with each issued data transfer instruction according to the transfer mode signal Mode, and all data associated with each data transfer instruction appear on the first or second O-bus 3a or 3b, the write/read pointer generating section 410 increments the read pointer for IPU or FPU, which is associated with each data transfer instruction, by one.

After that, when either the IPU 1 or at least one of the plurality of floating-point processing units FPU0 2a to FPU3 2d associated with each issued data transfer instruction receives a read enable signal, it reads data from a specific location within its own data output buffer, which is identified by the read pointer for IPU or FPU, and then sends out the data on the first or second O-bus 3a or 3b for IPU or FPU, which is associated with the processing unit that has received the read enable signal, as shown in FIG. 14.

As previously mentioned, the output FIFO data transfer control device according to the fifth embodiment of the present invention can prevent empty areas from appearing within the data output buffer of the IPU 1. The output FIFO data transfer control device can also reduce the number of empty areas that appear within the data output buffer of each of the plurality of floating-point processing units FPU0 2a to FPU3 2d. The output FIFO data transfer control device can thus transfer data at a high speed. Preferably, the output FIFO data transfer control device can generate a set of a write pointer and a read pointer for each of the plurality of floating-point processing units, thus preventing empty areas from appearing within the data output buffer of each of the plurality of floating-point processing units.

In addition, the output FIFO data transfer control device according to the fifth embodiment of the present invention includes the first and second O-buses 3a and 3b for use with IPU and FPU. Accordingly, the output FIFO data transfer control device can process a number of data at a time while transferring data to the plurality of OFIFOs 512 at a high speed.

Sixth Embodiment

Figure 16:
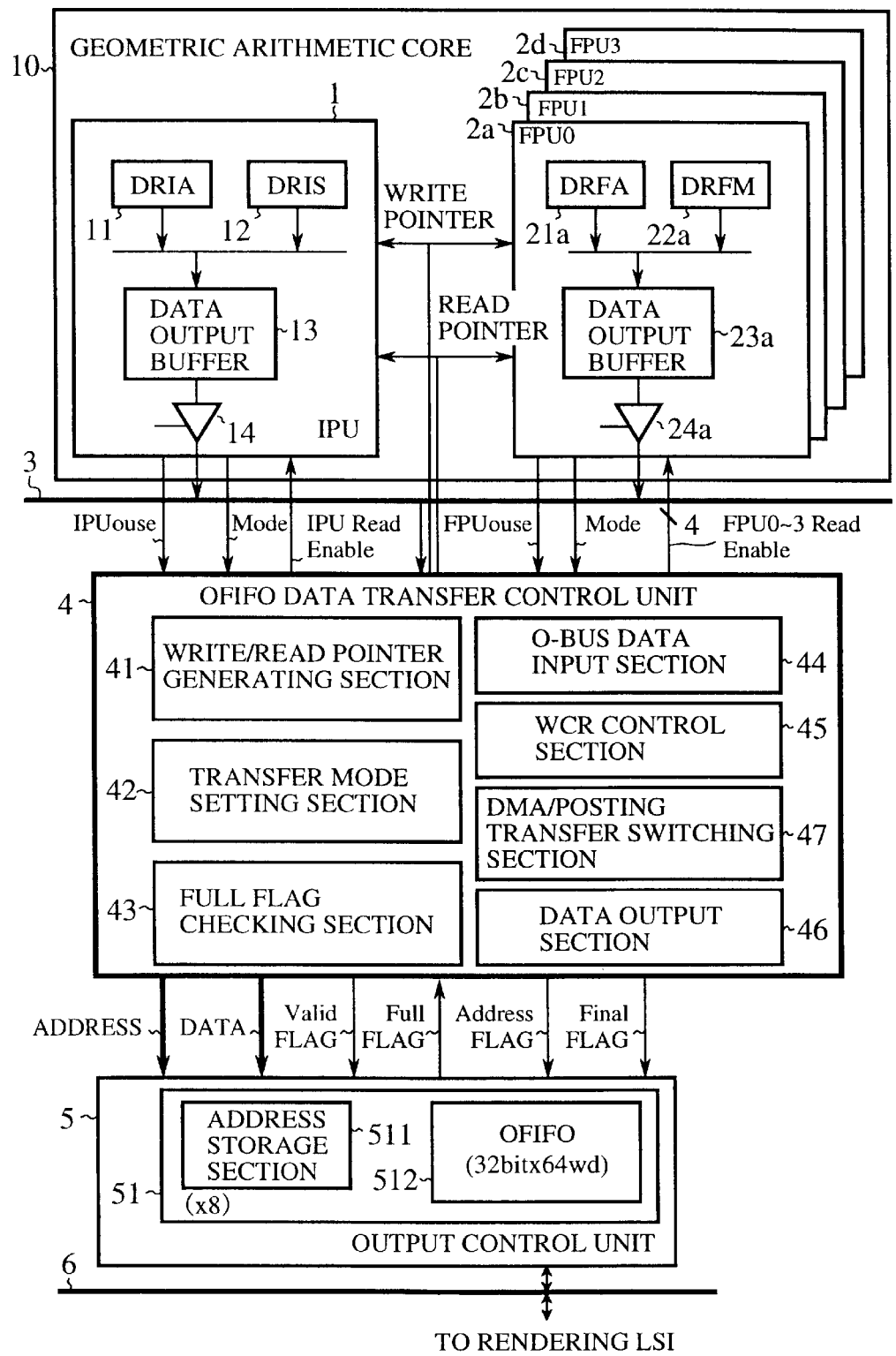
FIG. 16 is a block diagram showing the structure of an output FIFO data transfer control device according to a sixth embodiment of the present invention.

Referring next to FIG. 16, there is illustrated a block diagram showing the structure of an output FIFO data transfer control device according to a sixth embodiment of the present invention. In the figure, the same reference numerals as shown in FIG. 1 designate the same components as those of the output FIFO data transfer control device of the aforementioned first embodiment or like components, and therefore the description of the components will be omitted hereinafter. In FIG. 16, 47 denotes a DMA/posting transfer switching section for switching between DMA transfer and posting transfer by furnishing a final flag by way of a data output section 46 according to the value of a specific bit of a WCR within a WCR control section 45. The DMA/posting transfer switching section 47 determines whether it furnishes the final flag according to the value of the specific bit, e.g., bit 8, of the WCR within the WCR control section 45. For example, when bit 8 of the WCR within the WCR control section 45 is 1, the DMA/posting transfer switching section 47 sends out the final flag.

Since the basic operation of the output FIFO data transfer control device according to the sixth embodiment of the present invention is the same as that of the output FIFO data transfer control device of the aforementioned first embodiment, a description will be made as to only the difference between them, taking two cases in which the following microcodes are executed as examples for DMA transfer and posting transfer, respectively.

case (1):
    ldr 103h, wcr
    add ilm, ilm, ofifo0
    add ilm, ilm, ofifo0
    add ilm, ilm, ofifo0
    ldr 104h, wcr
    add ilm, ilm, ofifo0
    add ilm, ilm, ofifo0
    add ilm, ilm, ofifo0
    add ilm, ilm, ofifo0
    ldr 102h, wcr
    add ilm, ilm, ofifo0
    add ilm, ilm, ofifo0 case (2):
    ldr 003h, wcr
    add ilm, ilm, ofifo0
    add ilm, ilm, ofifo0
    add ilm, ilm, ofifo0
    ldr 004h, wcr
    add ilm, ilm, ofifo0
    add ilm, ilm, ofifo0
    add ilm, ilm, ofifo0
    add ilm, ilm, ofifo0
    ldr 102h, wcr
    add ilm, ilm, ofifo0
    add ilm, ilm, ofifo0

The case (1) is a case of posting transfer. In the case (1), the WCR control section 45 sets the value of the WCR to "103h" for the first burst. Since bit 8 of the WCR is 1 in the first burst, the DMA/posting transfer switching section 47 furnishes the final flag by way of the data output section 46 when the last data 3, which is the arithmetic result of the third "add" instruction, is stored in the data register of an O-bus data input section 44, as shown in FIG. 17. Since the posting transfer is most suitable for high-speed data transfer when a secondary bus 6 between an output control unit 5 and a rendering LSI (not shown) is a PCI bus, the posting transfer is selectively carried out. In the above case (1), addresses and data in all bursts are stored into the address registers 511a to 511c and OFIFOs 512a to 512c (or BANK1 to BANK3) within different OFIFO units 51a to 51c, respectively, as shown in FIG. 19(a).

In contrast, the case (2) is a case of DMA transfer. In the case (2), the WCR control section 45 sets the value of bit 8 of the WCR to 0 for each burst except the last burst so that the DMA/posting transfer switching section 47 does not furnish the final flag for each burst except the last burst. The WCR control section 45 sets the value of bit 8 of the WCR to 1 only for the last burst so that the DMA/posting transfer switching section 47 furnishes the final flag for the last burst by way of the data output section 46. In the case (2), the WCR control section 45 sets the values of the WCR for the first and second bursts to "003h" and "004h", as shown in FIG. 18. The WCR control section 45 then sets the value of the WCR for the last burst to "102h" so that bit 8 of the WCR is 1 and therefore the DMA/posting transfer switching section 47 sends out the final flag for the last burst. Since the DMA transfer is most suitable for high-speed data transfer when the secondary bus 6 between the output control unit 5 and a rendering LSI (not shown) is an AGP bus, the DMA transfer is selectively carried out. In the above case (2), addresses and data in all bursts are stored into the address register and OFIFO of the same OFIFO unit, e.g., the address register 511a and OFIFO 512a (BANK1) within the same OFIFO unit 51a, respectively, as shown in FIG. 19(b).

It is desirable for high-speed data transfer that data are stored into as contiguous areas as possible in each OFIFO 512 because reams of data can be transferred in the DMA transfer. In the DMA transfer, no data is transferred until one FIFO associated with a series of instructions, as in the case of the mentioned above case (2), is full or the final flag is sent out. The posting transfer is therefore suitable for transferring a small amount of data because in each burst the final flag is generated and data are transferred to outside the output FIFO data transfer control device.

As previously mentioned, in accordance with the sixth embodiment of the present invention, the output FIFO data transfer control device can switch between the DMA transfer and the posting transfer by causing the DMA/posting transfer control section 47 to control the output of the final flag according to the value of a specific bit of the WCR within the WCR control section 45. The output FIFO data transfer control device thus can perform most suitable data transfer according to the specifications (AGP or PCI bus) of the interface to a rendering LSI.

Seventh Embodiment

Figures 20A, 20B, 20C, 21:
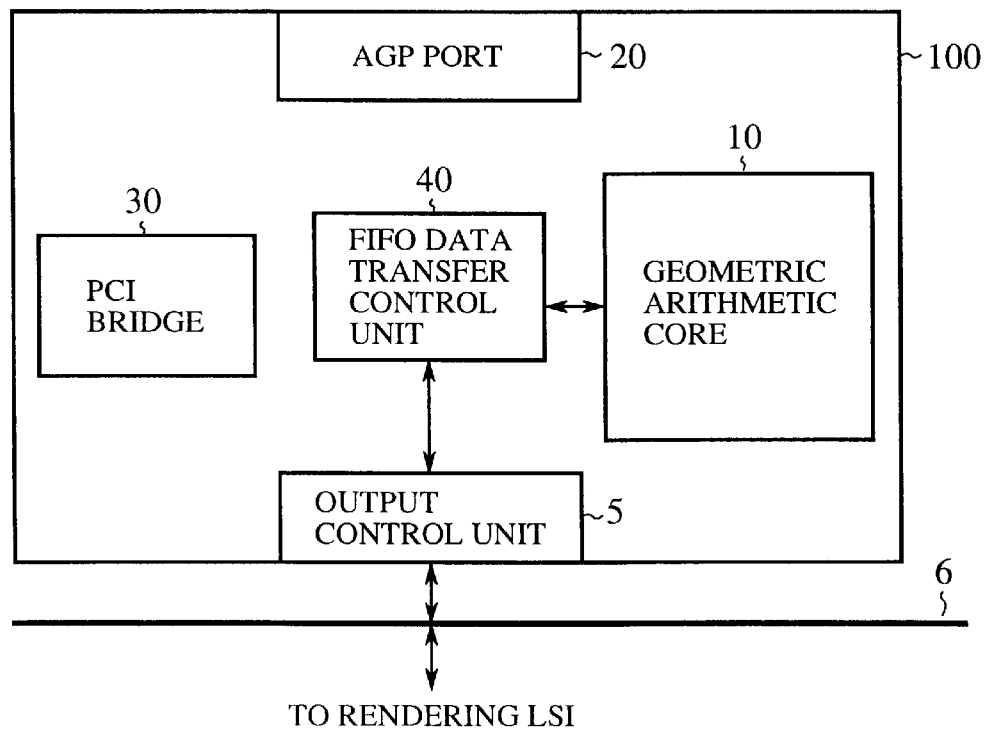
FIG. 21 is a block diagram showing the structure of a geometric arithmetic processor including a prior art output FIFO data transfer control device.
Figure 22:
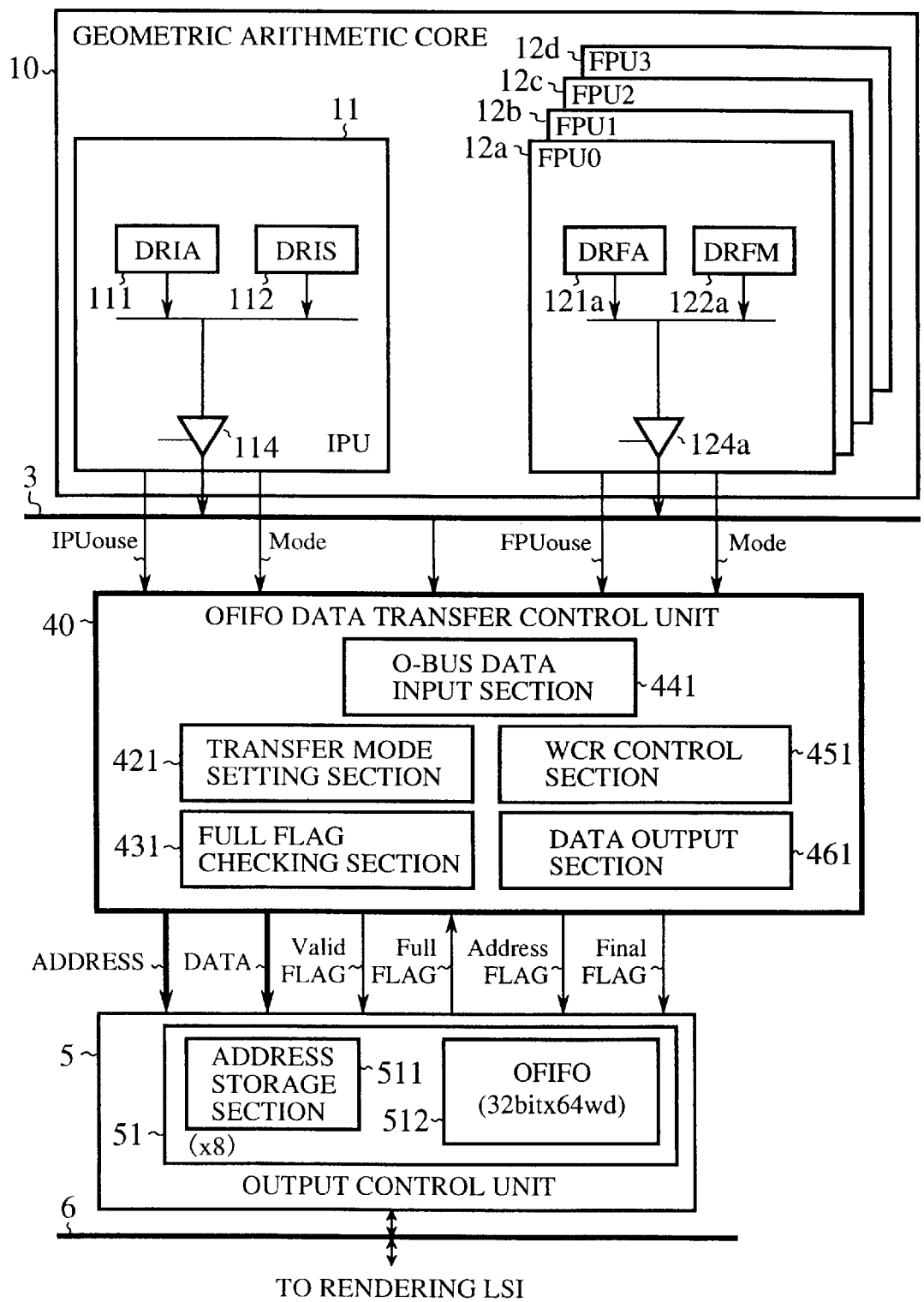
FIG. 22 is a block diagram showing the structure of the prior art output FIFO data transfer control device.

Referring next to FIG. 20(a) to 20(c), there are illustrated diagrams showing the size, in AGP mode, PCI mode, and improved PCI mode, of one OFIFO 512 of each OFIFO unit 51 within an output control unit 5, in an output FIFO data transfer control device according to a seventh embodiment of the present invention. Each OFIFO unit 51 within the output control unit 5 includes an address storage section 511 whose one specific bit is assigned to a flag used for switching among AGP, PCI, and improved PCI modes. The output FIFO data transfer control device can switch among the three modes according to the value of the specific bit of the address storage section 511 of each OFIFO unit, which can be set by a data output section 46 of an OFIFO data transfer control unit 4. Except for this structure, the output FIFO data transfer control device according to the seventh embodiment of the present invention has the same structure as the output FIFO data transfer control device of the aforementioned first embodiment as shown in FIG. 1, and therefore the description of the structure will be omitted hereinafter.

Since the basic operation of the output FIFO data transfer control device according to the seventh embodiment of the present invention is the same as that of the output FIFO data transfer control device of the aforementioned first embodiment, a description will be made as to only the difference between them.

Before the output FIFO data transfer control device starts transferring data to the next bank or OFIFO 512 within the output control unit 5, a Full flag checking section 43 checks a Full flag to determine whether the output FIFO data transfer control device can transfer data to the next bank. Since there is a difference in size of each bank or OFIFO 512 between AGP bus and PCI bus, the Full flag checking section 43 changes the timing with which it checks whether or not the next OFIFO 512 is full, according to the interface specification determination flag assigned to the predetermined bit of the corresponding address storage section 511. For example, when each OFIFO 512 has a size of (32 bits×64 words), as shown in FIG. 1, 64 32-bit words are sequentially written into each OFIFO 512 (or bank) in the order of the numbers 0, 1, 2, . . . , as shown in FIG. 20(*a*), and, after that, the checking of the Full flag is carried out, in AGP mode. In PCI mode, 32 32-bit words are sequentially written into each OFIFO 512 (or bank) in the order of the numbers 0, 1, 2, . . . , as shown in FIG. 20(*b*), and, after that, the checking of the Full flag is carried out, assuming that each OFIFO 512 is constructed of an area having a size of (32 bits×32 words) and an empty area having the same size as the former area. There thus exists an empty area in each OFIFO 512 in PCI mode as shown in FIG. 20(b). In contrast, in improved PCI mode, 64 32-bit words are sequentially written into each OFIFO 512 in the order of the numbers 0, 1, 2, . . . , as shown in FIG. 20(*c*), and, after that, the checking of the Full flag is carried out, assuming that each OFIFO 512 is constructed of two areas each having a size of (32 bits×32 words). In this case, the output FIFO data transfer control device can use all space in each OFIFO without producing wasted space, thus speeding up the data transfer. The OFIFO data transfer control unit 4 can change between different operations of generating and furnishing addresses each identifying a specific location where data is to be written into each OFIFO 512, according to one mode selected from the three modes.

As previously mentioned, the output FIFO data transfer control device according to the seventh embodiment of the present invention can change the timing with which it checks the Full flag according to the specifications (AGP or PCI bus) of the interface to a rendering LSI. The output FIFO data transfer control device thus can perform most suitable data transfer according to the specifications of the interface to a rendering LSI.

Many widely different embodiments of the present invention may be constructed without departing from the spirit and scope of the present invention. It should be understood that the present invention is not limited to the specific embodiments described in the specification, except as defined in the appended claims.

What is claimed is:

1. An output FIFO data transfer control device comprising:
    a plurality of intermediate buffers respectively disposed in a plurality of processing units included in an arithmetic core that operates based on an instruction pipeline, each of said plurality of intermediate buffers storing data on an arithmetic result produced by each of said plurality of processing units;
    output control means including one or more output FIFOs each of which receives data furnished by each of said plurality of processing units and temporarily stores the data therein, said output control means furnishing data stored in said output FIFOs to outside said output FIFO data transfer control device in response to a predetermined signal applied thereto;
    write/read pointer generating means for, when an instruction of data transfer from at least one of said plurality of processing units to said output FIFOs is issued upon execution of a microcode, generating a write pointer identifying a specific location where data on an arithmetic result produced by said at least one of said plurality of processing units associated with said instruction is to be stored in said intermediate buffer of said at least one of said plurality of processing units, and for generating a read pointer identifying a specific location where data, which is written into said intermediate buffer according to said write pointer, is to be read out of said intermediate buffer of said at least one of said plurality of processing units;
    transfer mode setting means for setting a transfer mode identifying which at least one of said plurality of processing units is to transfer data on an arithmetic result upon the execution of the microcode, and for sequentially furnishing a read enable signal to said at least one of said plurality of processing units so as to read out the data from said intermediate buffer of said at least one of said plurality of processing units;
    bus means on which the data is sent out in response to said read enable signal by said at least one of said plurality of processing units;
    data input means for receiving the data sent out on said bus means and for writing the data into a register thereof; and
    data output means for furnishing the data written into the register of said data input means to said output FIFOs of said output control means.

2. The output FIFO data transfer control device according to claim 1, wherein said write/read pointer generating means includes means for causing said arithmetic core to stop instruction pipeline processing to inhibit overwriting of old data with new data when said write/read pointer generating means determines that said intermediate buffer of each of said plurality of processing units is full.

3. The output FIFO data transfer control device according to claim 2, wherein said write/read pointer generating means determines whether or not said intermediate buffer of each of said plurality of processing units is full, according to a relationship between said write pointer and said read pointer.

4. The output FIFO data transfer control device according to claim 2, wherein said arithmetic core includes one integer processing unit and a plurality of floating-point processing units, and wherein said write/read pointer generating means generates a set of write and read pointers for use with the intermediate buffer of said integer processing unit and generates another set of write and read pointers for use with the intermediate buffers of said plurality of floating-point processing units.

5. The output FIFO data transfer control device according to claim 4, wherein said bus means includes a bus for use with said integer processing unit and another bus for use with said plurality of floating-point processing units.

6. The output FIFO data transfer control device according to claim 2, wherein said transfer mode setting means sets a transfer mode according to a multiple-bit signal furnished by said arithmetic core upon the execution of the microcode, said multiple-bit signal identifying which at least one of said plurality of processing units is to transfer data on an arithmetic result.

7. The output FIFO data transfer control device according to claim 2, further comprising DMA/posting transfer switching means for switching between DMA transfer and posting transfer when transferring the data from said output FIFOs to outside said output FIFO data transfer control device.

8. The output FIFO data transfer control device according to claim 7, further comprising word-counter register control means including a word counter showing the size of each burst of data transfer to said output FIFOs, and a register whose one bit is assigned to a final flag indicating that data to be transferred is the last data of each burst, and wherein said DMA/posting transfer switching means switches between DMA transfer and posting transfer by determining whether the final flag is furnished to said output control means including said output FIFOs according to a value set to said register of said word-counter register control means upon the execution of the microcode, and said output control means transfers data stored in said output FIFOs to outside said output FIFO data transfer control device in response to the final flag.

9. The output FIFO data transfer control device according to claim 2, further comprising full checking means for determining whether or not each of said output FIFOs is full with the time determined by predetermined information indicating whether an interface for use with data transfer from said output FIFOs to outside said output FIFO data transfer control device is an AGP or PCI bus.

10. The output FIFO data transfer control device according to claim 1, wherein said intermediate buffer of each of said plurality of processing units has a size of 8 words.

11. The output FIFO data transfer control device according to claim 2, wherein said intermediate buffer of each of said plurality of processing units has a size of 8 words.

12. The output FIFO data transfer control device according to claim 1, wherein said arithmetic core includes one integer processing unit and a plurality of floating-point processing units, and wherein said write/read pointer generating means generates a set of write and read pointers for use with the intermediate buffer of said integer processing unit and generates another set of write and read pointers for use with the intermediate buffers of said plurality of floating-point processing units.

13. The output FIFO data transfer control device according to claim 12, wherein said bus means includes a bus for use with said integer processing unit and another bus for use with said plurality of floating-point processing units.

14. The output FIFO data transfer control device according to claim 1, wherein said transfer mode setting means sets a transfer mode according to a multiple-bit signal furnished by said arithmetic core upon the execution of the microcode, said multiple-bit signal identifying which at least one of said plurality of processing units is to transfer data on an arithmetic result.

15. The output FIFO data transfer control device according to claim 1, further comprising DMA/posting transfer switching means for switching between DMA transfer and posting transfer when transferring the data from said output FIFOs to outside said output FIFO data transfer control device.

16. The output FIFO data transfer control device according to claim 15, further comprising word-counter register control means including a word counter showing the size of each burst of data transfer to said output FIFOs, and a register whose one bit is assigned to a final flag indicating that data to be transferred is the last data of each burst, and wherein said DMA/posting transfer switching means switches between DMA transfer and posting transfer by determining whether the final flag is furnished to said output control means including said output FIFOs according to a value set to said register of said word-counter register control means upon the execution of the microcode, and said output control means transfers data stored in said output FIFOs to outside said output FIFO data transfer control device in response to the final flag.

17. The output FIFO data transfer control device according to claim 1, further comprising full checking means for determining whether or not each of said output FIFOs is full with the time determined by predetermined information indicating whether an interface for use with data transfer from said output FIFOs to outside said output FIFO data transfer control device is an AGP or PCI bus.

* * * * *